(12) United States Patent
Loi et al.

(10) Patent No.: US 8,988,740 B2
(45) Date of Patent: Mar. 24, 2015

(54) SCANNING METHOD AND APPARATUS

(75) Inventors: Yew Kien Loi, Singapore (SG); Ling Chuing Goh, Singapore (SG); Swee Heng Yeo, Singapore (SG); Boon Chen Lee, Singapore (SG); Gunawan Sutono, Singapore (SG)

(73) Assignee: Piqx Imaging Pte Ltd, Singapore (SG)

( * ) Notice: Subject to any disclaimer, the term of this patent is extended or adjusted under 35 U.S.C. 154(b) by 0 days.

(21) Appl. No.: 13/994,025

(22) PCT Filed: Jan. 4, 2011

(86) PCT No.: PCT/SG2011/000003
§ 371 (c)(1),
(2), (4) Date: Aug. 28, 2013

(87) PCT Pub. No.: WO2012/093963
PCT Pub. Date: Jul. 12, 2012

(65) Prior Publication Data
US 2014/0293370 A1 Oct. 2, 2014

(51) Int. Cl.
| | |
|---|---|
| H04N 1/04 | (2006.01) |
| H04N 1/028 | (2006.01) |
| H04N 1/00 | (2006.01) |
| H04N 101/00 | (2006.01) |
| G06K 9/20 | (2006.01) |

(52) U.S. Cl.
CPC ....... *H04N 1/02815* (2013.01); *H04N 1/00758* (2013.01); *H04N 2101/00* (2013.01); *G06K 9/2027* (2013.01)
USPC ........ 358/474; 358/475; 358/509; 348/208.4; 382/167; 250/208.4

(58) Field of Classification Search
CPC ............. G03B 17/20; G03B 2217/005; G03B 2207/005; G03B 2227/005; G03B 27/462; G03B 37/00; G03B 7/00; G03B 7/091; G02B 21/365; G02B 21/06; G02B 21/18; G02B 21/361; G06T 1/0007; H04N 1/193
USPC ............... 348/208.4; 358/474, 487, 518, 475, 358/509, 486, 506, 500, 497, 496, 520, 358/525; 382/153, 275, 167; 250/208.04
See application file for complete search history.

(56) References Cited

U.S. PATENT DOCUMENTS

| | | | |
|---|---|---|---|
| 5,047,861 A | 9/1991 | Houchin et al. | |
| 5,682,567 A * | 10/1997 | Spruck et al. | 396/432 |
| 6,590,660 B2 * | 7/2003 | Jung et al. | 356/419 |
| 6,979,834 B2 * | 12/2005 | Ochiai et al. | 250/559.42 |

(Continued)

OTHER PUBLICATIONS

International Search Report for PCT/SG2011/000003, dated Mar. 15, 2011, 3 pages.

(Continued)

*Primary Examiner* — Negussie Worku
(74) *Attorney, Agent, or Firm* — Hovey Williams LLP

(57) ABSTRACT

A scanning method and apparatus. The method comprising the steps of: measuring an ambient video level using an area sensor under the control of a processor means; and calculating a gain and/or a exposure time and/or light source power for an actual flash video level using a stored reference flash video level and the measured ambient video level such that a summation of the actual flash video level and the ambient video level yields a desired video level in a scan image of the document using the calculated gain and/or exposure time and/or light source power.

29 Claims, 33 Drawing Sheets

(56) References Cited

U.S. PATENT DOCUMENTS

| | | | |
|---|---|---|---|
| 7,271,952 B2 * | 9/2007 | Suzuki et al. | 359/368 |
| 7,292,275 B2 * | 11/2007 | Masuyama | 348/297 |
| 7,303,126 B2 | 12/2007 | Patel et al. | |
| 7,554,704 B2 * | 6/2009 | Ishizuka | 358/487 |
| 7,580,058 B2 * | 8/2009 | Ayaki et al. | 348/208.12 |
| 7,746,513 B2 * | 6/2010 | Chen et al. | 358/474 |
| 7,961,246 B2 * | 6/2011 | Watanabe | 348/362 |
| 8,390,682 B2 * | 3/2013 | Minamide | 348/80 |
| 8,441,539 B2 * | 5/2013 | Tokui | 348/208.4 |
| 8,459,556 B2 * | 6/2013 | Zhou | 235/462.07 |
| 8,508,376 B2 * | 8/2013 | Knox et al. | 340/628 |
| 8,659,675 B2 * | 2/2014 | Takahashi et al. | 348/224.1 |
| 8,669,997 B2 * | 3/2014 | Kotani | 345/589 |

OTHER PUBLICATIONS

Written Opinion of the International Searching Authority for PCT/SG2011/000003, dated Mar. 8, 2011, 6 pages.

* cited by examiner

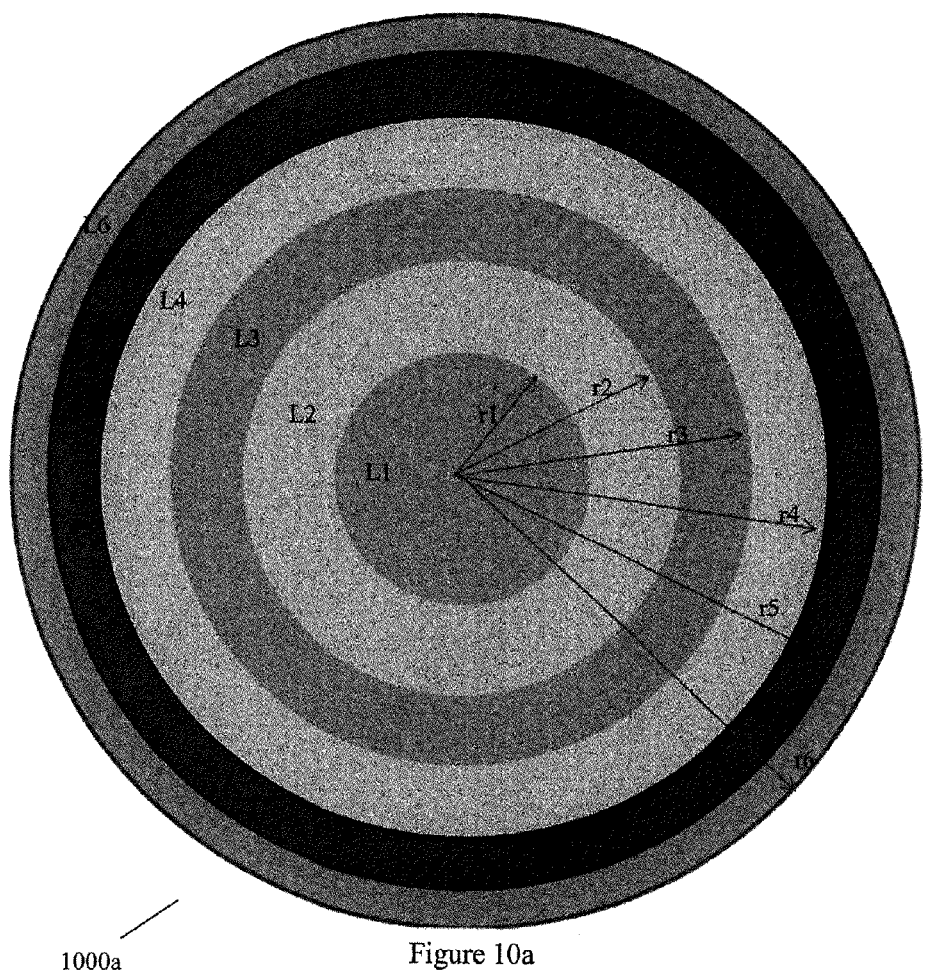
1000a  Figure 10a

SCANNING METHOD AND APPARATUS

RELATED APPLICATION

The present application is a national stage application under 35 U.S.C. §371 of International Application No. PCT/SG2011/000003, filed Jan. 4, 2011, which is incorporated by reference herein in its entirety.

FIELD OF INVENTION

The invention broadly relates to a method of scanning and an apparatus thereof. In particular, the invention pertains to a method of scanning using an area sensor.

BACKGROUND

The digitizing of analog information that is printed on paper or any other medium (hereinafter termed as 'scanning') while on-the-move is somewhat cumbersome due to the considerable size and weight of scanners available today. Mobile scanning solutions available today generally use linear image sensors which scan a document line by line. However, they typically require either motorized paper feeding (sheet-feed scanners) or a moving carriage (flatbed scanners) which results in significant weight and bulk. An additional limitation of sheet-feed scanners is their inability to directly scan bounded materials such as passports, magazine pages or multi-paged documents.

Instead of utilizing linear image sensors, an alternative method of mobile scanning involves taking a digital photograph with digital image capturing devices such as digital cameras. These digital image capturing devices typically comprise an area image sensor. Area image sensors can capture the entire scan area on its sensing surface rather than capturing the image line-by-line as with linear sensors. Without the need for paper feeding, such digital image capturing devices have the ability to scan bounded and multi-paged materials. Also, such image capturing devices are usually lighter and smaller than conventional scanners because they do not require any motor or moving mechanism (gear, belt, pulley, carriage, plate, etc). Although this can result in a relatively more portable scanning solution, disadvantages include image distortion due to ambient light. For example, a bright spot from an overhead light source can be seen on the captured image. Shadows can also appear when there is blockage of light, for instance, when a user's hand is positioned above the target object when taking a digital photo.

Furthermore, images may be blurred if the user's hand is not steady and/or the flash is not used. If a flash is used, a flash spot usually appears on the digital image, especially if the document to be scanned is of the glossy/specular reflectable type. The conventional way to solve this is by moving the light source far away or/and to the bottom side of the photo sensor. In this way, the flash spot will appear outside of the document scan area. However, a lot of light power is wasted and the light output is very low. Furthermore, the size of the scanner cannot be made small if the photo sensor and light source were to be in the same housing.

In addition, if the image is not aimed directly to the paper plane, there can be a perspective distortion.

A need therefore exists to provide, a method of scanning and an apparatus thereof that seeks to address at least one of the abovementioned problems.

SUMMARY

According to the first aspect of the present invention, there is provided a scanner device comprising: an area sensor; a light source; and a processor means; wherein the scanner device is configured such that the area sensor, under the control of the processor means, measures an ambient video level; and the processor means calculates a gain and/or a exposure time and/or light source power for an actual flash video level using a stored reference video level and the measured ambient video level such that a summation of the actual flash video level and the ambient video level yields a desired video level in a scan image of the document using the calculated gain and/or exposure time and/or light source power.

The desired video level may be associated with a brightest video level having a threshold pixel count in the measured ambient video level.

The scanner device may be configured such that the processor means performs image processing on the scan image of the document for uniformity correction and ambient light removal.

The image processing may comprise using a stored reference uniformity profile for the uniformity correction.

The area sensor, under the control of the processor means, may take an ambient video level image of the document in a first frame of a scanning mode or a frame obtained from a low resolution video mode during preview, and may take the scan image of the document using the calculated gain and/or exposure time and/or light source power in a second frame, and the image processing may comprise subtracting the ambient video level image from the scan image for the ambient light removal.

The scanner may further comprise a plurality of light sources and a shutter for the area sensor, the shutter may be configured such that the area sensor captures different portions of a single frame during the exposure to different ones of the light sources such that flash spots may be removed from the scan image.

The light source may comprise a lens configured to provide substantially uniform light luminance at different scan distances and perspectives.

The processor means may apply rotational alignment, perspective alignment, automatic cropping, and/or automatic orientation.

The scanner may further comprise a user interface for providing a blank canvas for positioning different portions of the scan image into a single image file.

The scanner may further comprise means for detecting corners of a document by image processing in a live preview mode, and a user interface for displaying the detected corners in a live view image.

The scanner may further comprise means for real-time user assignment of scan boundaries, and a user interface for displaying the scan boundaries in a live view image.

The scanner may further comprise means for assigning adjustable marquee scan areas for data picking for the scanning.

The scanner may further comprise means for projecting one or more markers indicative of a scan area.

The scanner may further comprise attachment means for attaching the scanner to an external device.

The attachment means may be configured for releasably attaching the scanner to the external device.

The attachment means may comprise a support member disposed between two or more attachment elements, wherein the support member support a main body of the scanner and the attachment elements may be configured to attaching to different portions of the external device.

One of the attachment elements may comprise a hook portion for connecting to an edge of the external device, and the other attachment element may comprise a first velcro-based element for co-operating with a second velcro-based element disposed on the external device.

The scanner may further comprise a plurality of light sources, each light source having an associated blocking means, the blocking means may be configured to block the associated light source in a direction of a flash spot, such that flash spots may be removed from the scan image.

The area sensor may be tilted relative to a scanner body such that a minimum distance between the area sensor and a light source of the scanner for removing a flash spot from the scan image may be reduced compared to an un-tilted configuration.

According to a second aspect of the present invention, there is provided a method of scanning, comprising the steps of: measuring an ambient video level using an area sensor under the control of a processor means; and calculating a gain and/or a exposure time and/or light source power for an actual flash video level using a stored reference flash video level and the measured ambient video level such that a summation of the actual flash video level and the ambient video level yields a desired video level in a scan image of the document using the calculated gain and/or exposure time and/or light source power.

The desired video level may be associated with a brightest video level having a threshold pixel count in the measured ambient video level.

The method may further comprise the step of performing image processing on the scan image of the document for uniformity correction and ambient light removal.

The step of image processing may comprise using a stored reference uniformity profile for the uniformity correction.

The method may further comprise the steps of: taking an ambient video level image of the document in a first frame of a scanning mode or a frame obtained from a low resolution video mode during preview; taking the scan image of the document using the calculated gain and/or exposure time and/or light source power in a second frame; and subtracting the ambient video level image from the scan image for the ambient light removal.

The method may further comprise using a plurality of light sources and a shutter for the area sensor such that the area sensor captures different portions of a single frame during the exposure to different ones of the light sources such that flash spots may be removed from the scan image.

The area sensor may comprise a lens configured to provide substantially uniform light luminance at different scan distances and perspectives.

The method may further comprise the step(s) of applying rotational alignment, perspective alignment, automatic cropping and/or automatic orientation.

The method may further comprise the step of positioning different portions of the scan image into a single image file on a blank canvas.

The method may further comprise the step of projecting one or more markers indicative of a scan area.

The method may further comprise using a plurality of light sources, each light source having an associated blocking means, and using the blocking means to block the associated light source in a direction of a flash spot, such that flash spots may be removed from the scan image.

The method may further comprise disposing the area sensor such that it captures the scan image at an off-normal angle with respect to the document such that flash spots may be removed from the scan image.

The method may further comprise tilting the area sensor relative to a scanner body such that a minimum distance between the area sensor and a light source of the scanner for removing a flash spot from the scan image may be reduced compared to an un-tilted configuration.

The method may further comprise applying a perspective correction algorithm to the scan image.

The method may further comprise automatically detecting a glossy document intended for scanning for changing between a glossy mode and a normal mode of scanning.

BRIEF DESCRIPTION OF THE DRAWINGS

Example embodiments of the invention will be better understood and readily apparent to one of ordinary skill in the art from the following written description, by way of example only, and in conjunction with the drawings, in which:

FIG. 10a is a diagram depicting the light luminance profile on a scan area.

DETAILED DESCRIPTION

In an example embodiment of the present invention, there is provided a method of scanning a document with an area sensor wherein ambient light disturbance can be advantageously minimized. In addition to the area sensor, a bright light source (e.g. LED or Xenon) and a global (electronic or mechanical) shutter are provided to advantageously minimize sensor integration time. In this example embodiment, a global shutter (such as used in high end cameras, for example DSLR cameras) is preferred to a rolling shutter (typically found in mobile phone cameras) as relatively shorter exposure times can be achieved. An algorithm to determine a suitable exposure time ($t_e$), gain (G) and flash power ($L_f$) is also provided.

When capturing an image, the area sensor is exposed to ambient light ($L_a$) and a flash light ($L_f$) for $t_e$ seconds. The area sensor converts the image to an electric signal. The electric signal can be a voltage signal, which can be subsequently amplified by a suitable gain (G). The amplified voltage signal, which may be in the range of 0 to 2V, is fed to an analog-to-digital converter (ADC). The ADC outputs digital data, for example, in 8 bit format (0-255 video levels).

A video level ($V_o$) can be obtained from the ADC and is defined as follows:

$$V_o = K_1 \cdot K_2 (L_f + L_a) \cdot t_e \quad (1),$$

$K_1$ is a constant depending on characteristics of the area sensor (e.g. pixel size), lens (e.g f number) and the size of the area being scanned (e.g sensor-document distance and view angle), and $K_2$ is equal to {255/ADC input range} for 8 bit data.

In particular, a reference flash video level ($V_{o1}$) can be measured, for example, during manufacturing, and is defined as follows:

$$V_{o1} = K(L_{f1}+0) \cdot t_{e1} \cdot G_1 \quad (2),$$

$K = K_1 \cdot K_2$ (as above).

The reference flash video level ($V_{o1}$) is measured at a given exposure time ($t_{e1}$) and gain ($G_1$), using a blank white piece of paper as the reference object. The measured reference flash video level $V_{o1}$ and the settings used ($L_{f1}$, $t_{e1}$, $G_1$) can be stored in the scanner memory for future reference.

Thereafter, during use, and before every scan, an ambient video level ($V_{oa}$) of the scanning condition is determined, wherein:

$$V_{oa} = K(0+L_a) \cdot t_{e1} \cdot G_1 \quad (3),$$

The ambient video level ($V_{oa}$) can also be obtained from a low resolution video mode during a live preview (on a graphical user interface) of a scan image.

Figure 1:
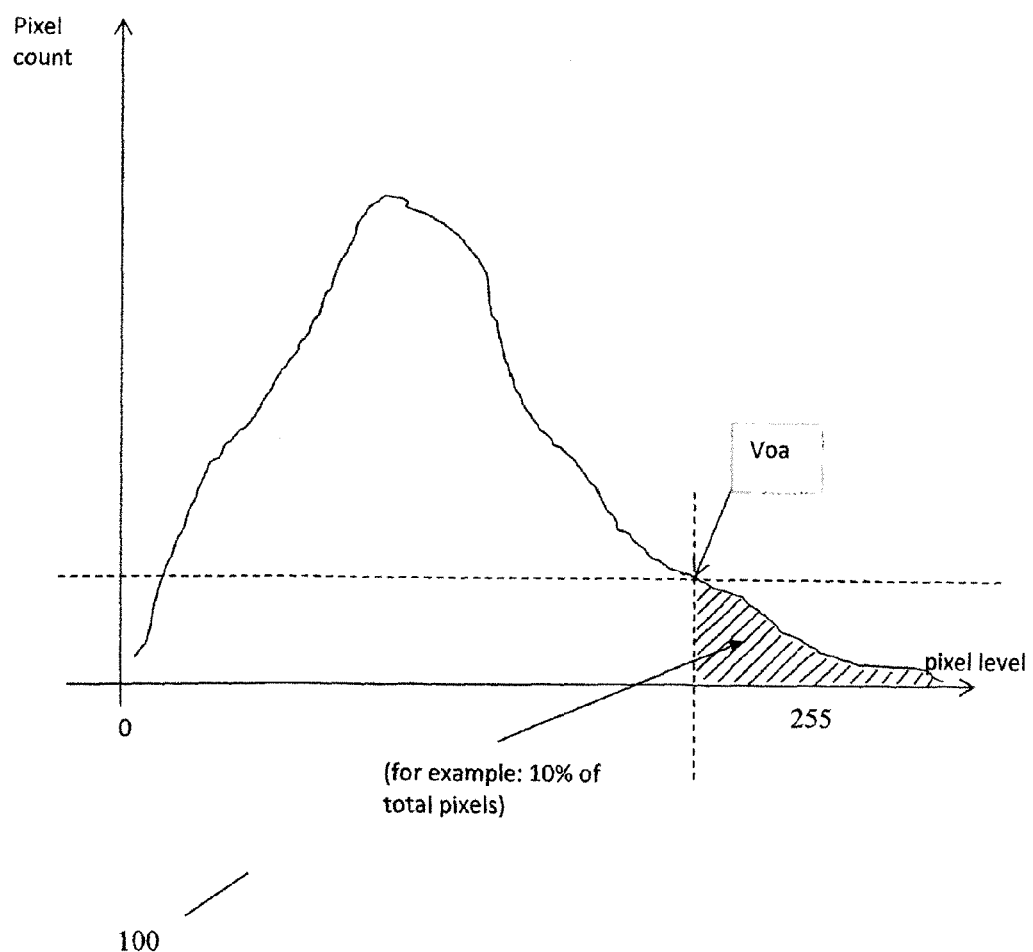
FIG. 1 is a histogram indicating video level $V_{oa}$, according to an embodiment of the present invention.

FIG. 1 is a histogram of an example image, designated generally as reference numeral 100, according to an embodiment of the present invention, indicating video level $V_{oa}$, which is the brightest video level whereby there is substantial pixel count equal or brighter than it, in this example, 10% of the total number of pixels. However, it will be appreciated that in different embodiments, $V_{oa}$ can be set to different values.

Figure 2:
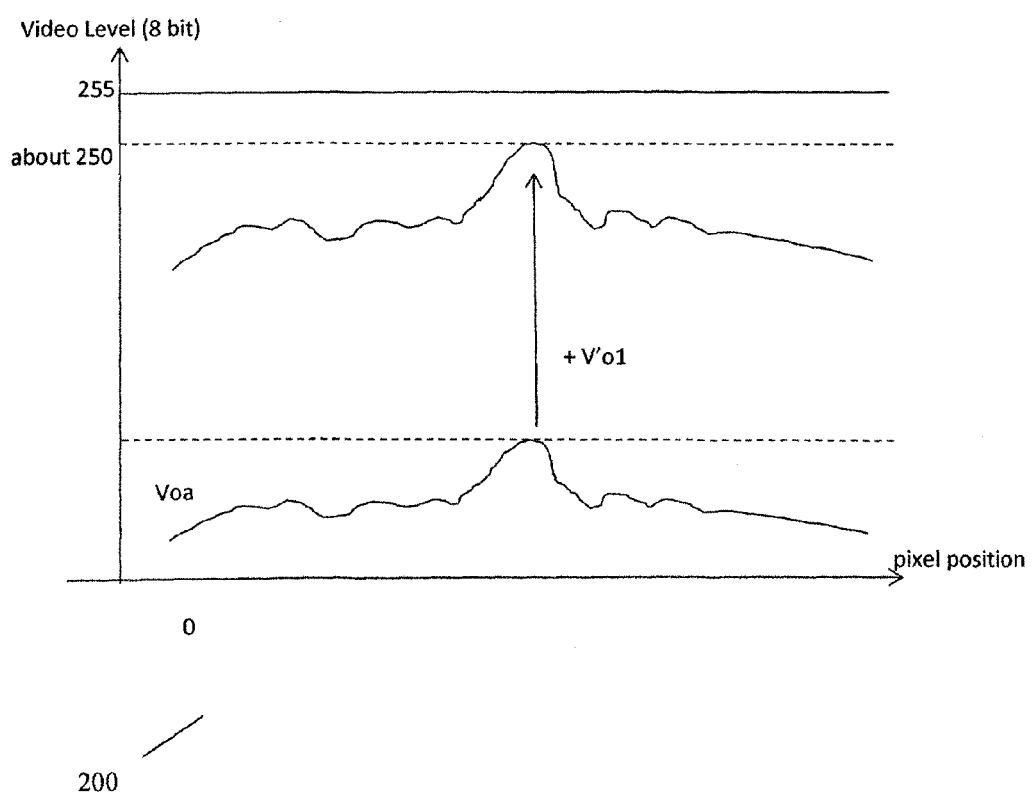
FIG. 2 is a chart illustrating the video level $V_{oa}+V_{o1}$ being adjusted to a video level of about 250, according to an embodiment of the present invention.

In the example embodiment, the aim is to determine an actual flash video level $V'_{o1}$ such that the sum of $V_{oa}$ and $V'_{o1}$ yields a desired video level, e.g. 250, as illustrated in FIG. 2. i.e.:

$$V_{oa} + V'_{o1} = 250 \quad (4)$$

The variables $t_e$, G and $L_f$ (see equation (3)) are adjusted accordingly such that ($V_{oa}+V'_{o1}$) is at a video level of about 250.

It will be appreciated that in different embodiments, the desired video level can be set to different values than 250.

To obtain the desired video level based on the stored reference level (see equation (2)), one can either (i) adjust the Gain (G) while keeping the flash power ($L_f$) and the exposure time ($t_e$) fixed; (ii) adjust the $t_e$, keeping $L_f$ and G fixed; or (iii) $L_f$ by fixing the ratio of $L_f$ to $L_a$, then adjust either $t_e$ or G.

Figure 3:
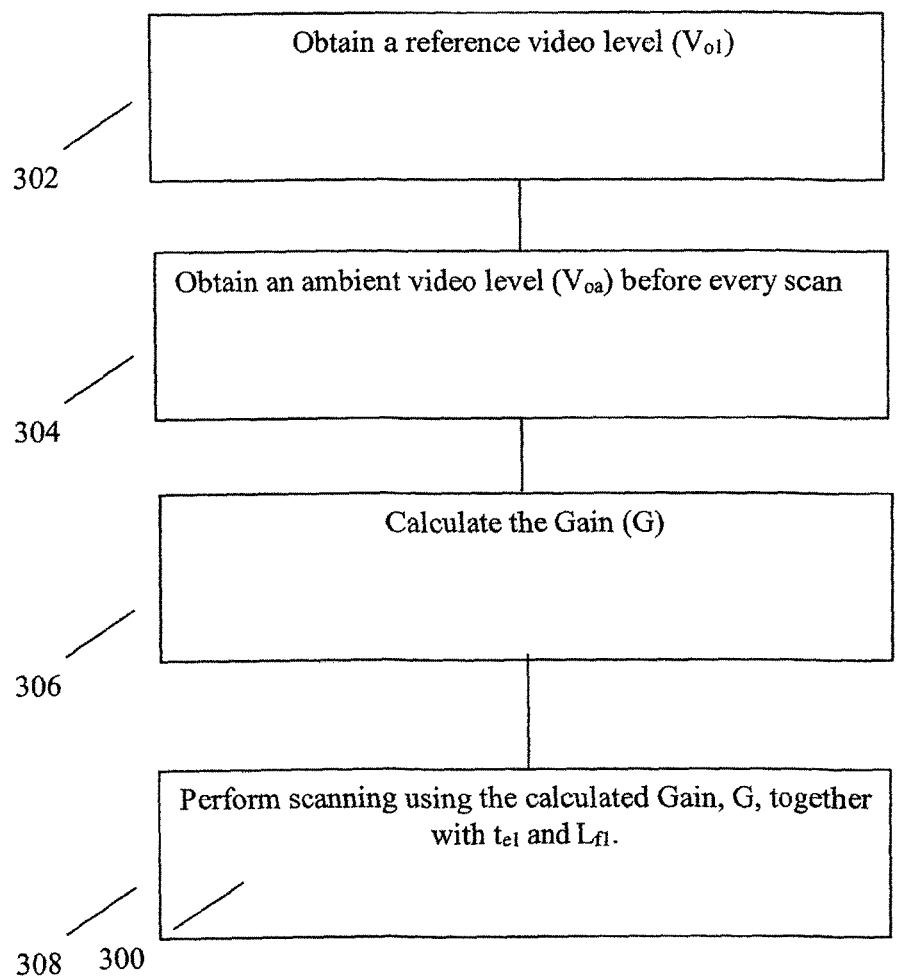
FIG. 3 is a flow chart illustrating a method of adjusting the Gain (G), according to an embodiment of the present invention.

FIG. 3 is a flow chart, designated generally as reference numeral 300, illustrating a method of adjusting the Gain (G), according to an embodiment of the present invention. At step 302, a reference flash video level ($V_{o1}$) is obtained (as described above). At step 304, before every scan, an ambient video level ($V_{oa}$) of the scanning condition is determined (as described above). At step 306, the Gain, G, is calculated using the formulae:

$$\frac{V_{oa} + V_{o1}}{V_{tgt}} = \frac{K(L_{f1} + L_a) \cdot t_{e1} \cdot G_1}{K(L_{f1} + L_a) \cdot t_{e1} \cdot G} \quad (5)$$

$$\therefore G = G_1 \times \frac{V_{tgt}}{V_{oa} + V_{o1}}.$$

In this instance, $V_{tgt}$ can be the 250 video level. At step 308, scanning is performed using the calculated Gain, G, together with $t_{e1}$ and $L_{f1}$.

Figure 4:
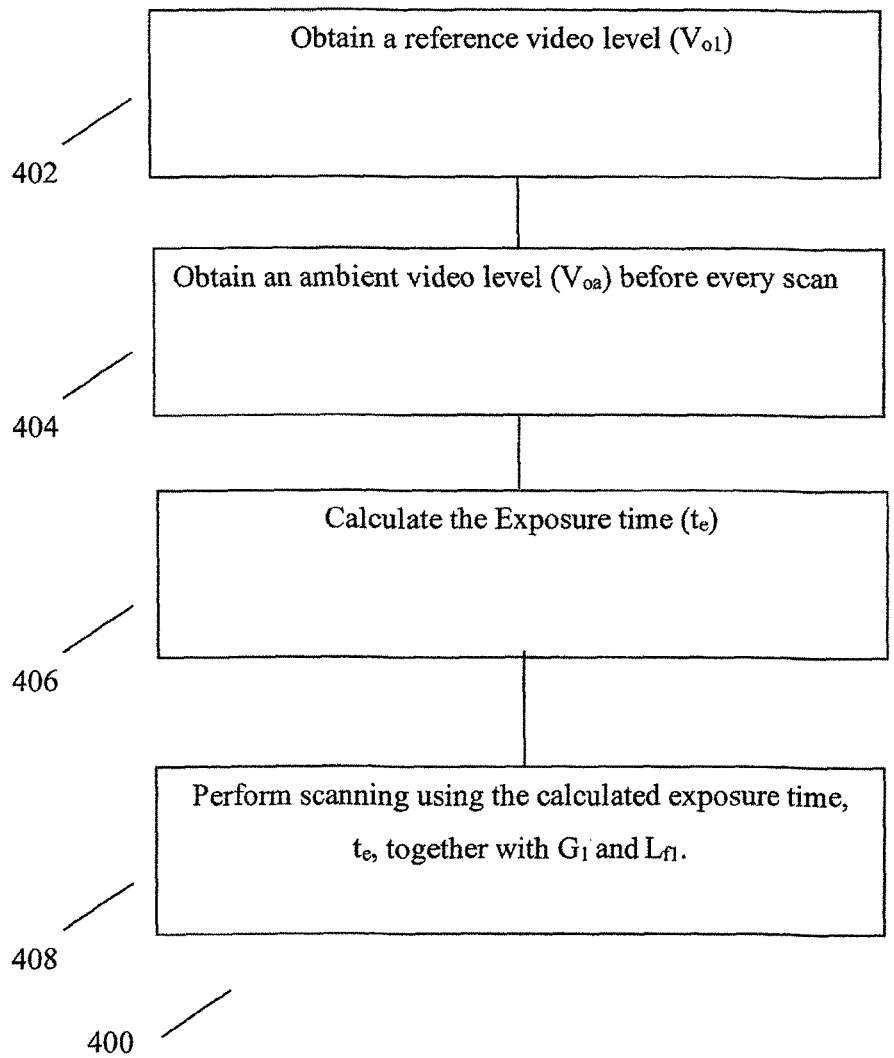
FIG. 4 is a flow chart illustrating a method of adjusting the exposure time, $t_e$, according to an embodiment of the present invention.

FIG. 4 is a flow chart, designated generally as reference numeral 400, illustrating a method of adjusting the exposure time, $t_e$, according to an embodiment of the present invention. At step 402, a reference flash video level ($V_{o1}$) is obtained (as described above). At step 404, before every scan, an ambient video level ($V_{oa}$) of the scanning condition is determined (as described above). At step 406, the exposure time, $t_e$, is calculated using the formulae:

$$\frac{V_{oa} + V_{o1}}{V_{tgt}} = \frac{K(L_{f1} + L_a) \cdot t_{e1} \cdot G_1}{K(L_{f1} + L_a) \cdot t_e \cdot G_1} \quad (6)$$

$$\therefore t_e = t_{e1} \times \frac{V_{tgt}}{V_{oa} + V_{o1}}.$$

In this instance, $V_{tgt}$ can be the 250 video level. At step 408, scanning is performed using the calculated exposure time, $t_e$, together with $G_1$ and $L_{f1}$.

Figure 5:
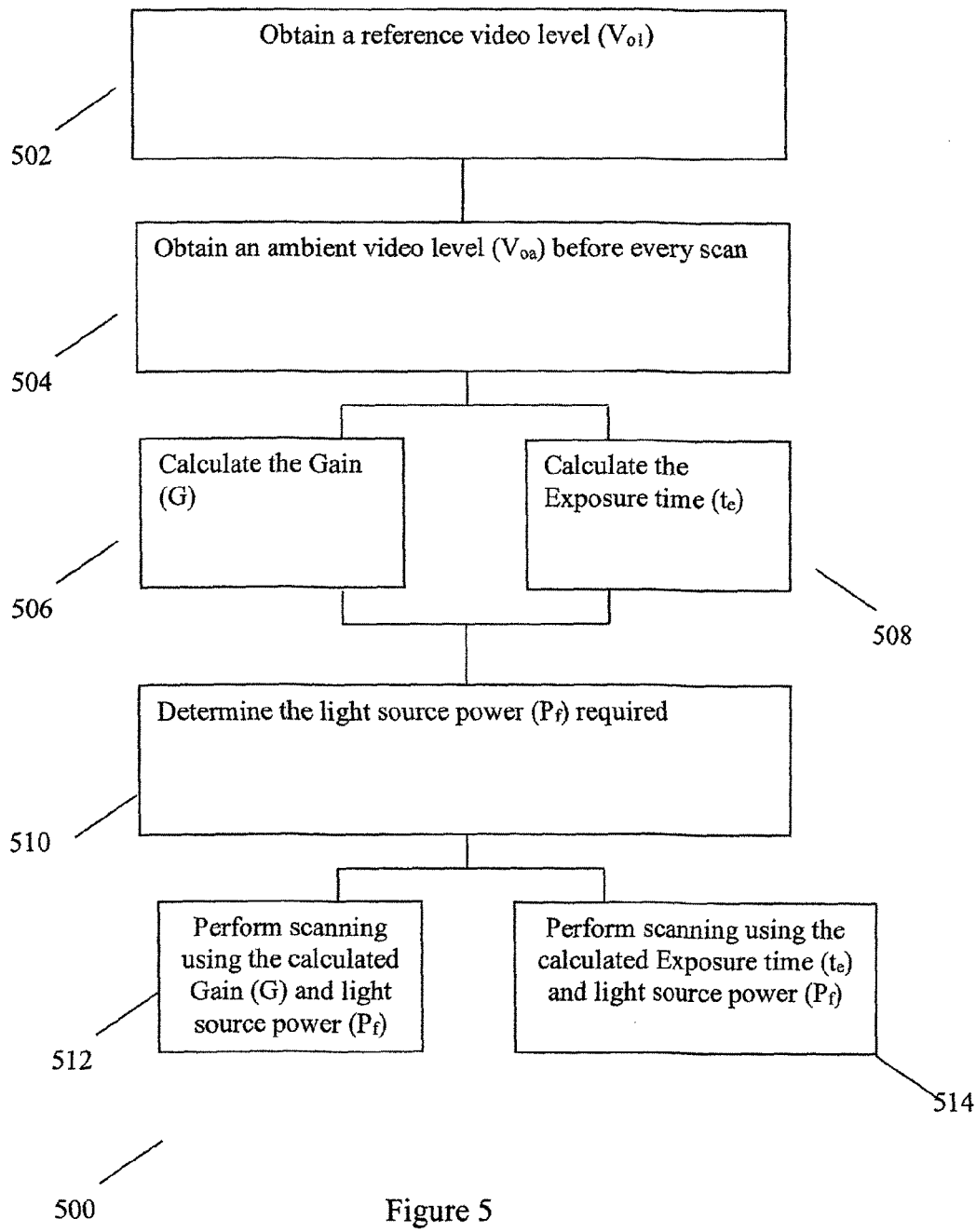
FIG. 5 is a flow chart illustrating a method of adjusting the flash power, $L_f$, according to an embodiment of the present invention.

FIG. 5 is a flow chart, designated generally as reference numeral 500, illustrating a method of adjusting the flash power, $L_f$, according to an embodiment of the present invention. At step 502, a reference flash video level ($V_{o1}$) is obtained (as described above). At step 504, before every scan, an ambient video level ($V_{oa}$) of the scanning condition is determined (as described above). At step 506, the Gain, G, is calculated via the formula:

$$G = G_1 \times \frac{V_{tgt}}{V_{oa} + (K_f \cdot V_{oa})}. \quad (7)$$

In this instance, $V_{tgt}$ can be the 250 video level. Alternatively to step 506, at step 508, the exposure time, $t_e$, is calculated via the formula:

$$t_e = t_{e1} \times \frac{V_{tgt}}{V_{oa} + (K_f \cdot V_{oa})}. \quad (8)$$

Similarly, $V_{tgt}$ can be the 250 video level.

After either step 506 or 508, at step 510, the light source power ($P_f$) that is required can be calculated as follows:

$$\frac{P_f}{P_{f1}} = \frac{V_f}{V_{o1}},$$

where $P_{f1}$ is the flash power used during the initial referencing which gives $V_{o1}$.

$$\frac{P_f}{P_{f1}} = \frac{K_f \cdot V_{oa}}{V_{o1}},$$

where $K_f = V_f / V_{oa}$, the desired flash over ambient light ratio.

$$\therefore P_f = \frac{P_{f1} \cdot K_f \cdot V_{oa}}{V_{o1}}. \quad (9)$$

The light source power ($P_f$) of a LED light source can be adjusted by varying its forward current. At step 512, scanning is performed using the calculated Gain (G) and light source power ($P_f$) values. Alternatively to step 512, at step 514, scanning is performed using the calculated exposure time ($t_e$) and source power ($P_f$) values. The global shutter as described above advantageously facilitates the use of a fast exposure time ($t_e$) and a flash with high source power ($P_f$).

Combinations of the gain (G), exposure time ($t_e$) and source power ($P_f$) can be calculated analytically. Accordingly, it will be appreciated that in other example embodiments, scanning can be performed using an analytically determined combination of one or more of the calculated gain (G), exposure time ($t_e$) and source power ($P_f$).

A hierarchy can be established wherein a particular variable is calculated in preference to others. For example, depending on product priority:

i. Gain adjustment can be carried out first if product cost/simplicity is desired, sacrificing on image noise and ambient light disturbance ii. Exposure time adjustment can be carried out first if the lowest image noise is desired, sacrificing on image sharpness if there is scanner/document motion while scanning (e.g. when the exposure time is longer than 10 ms)

iii. Source power adjustment can be carried out first if lowest ambient light disturbance is desired, sacrificing on product size (as a bigger capacitance may be required)

Figure 6:
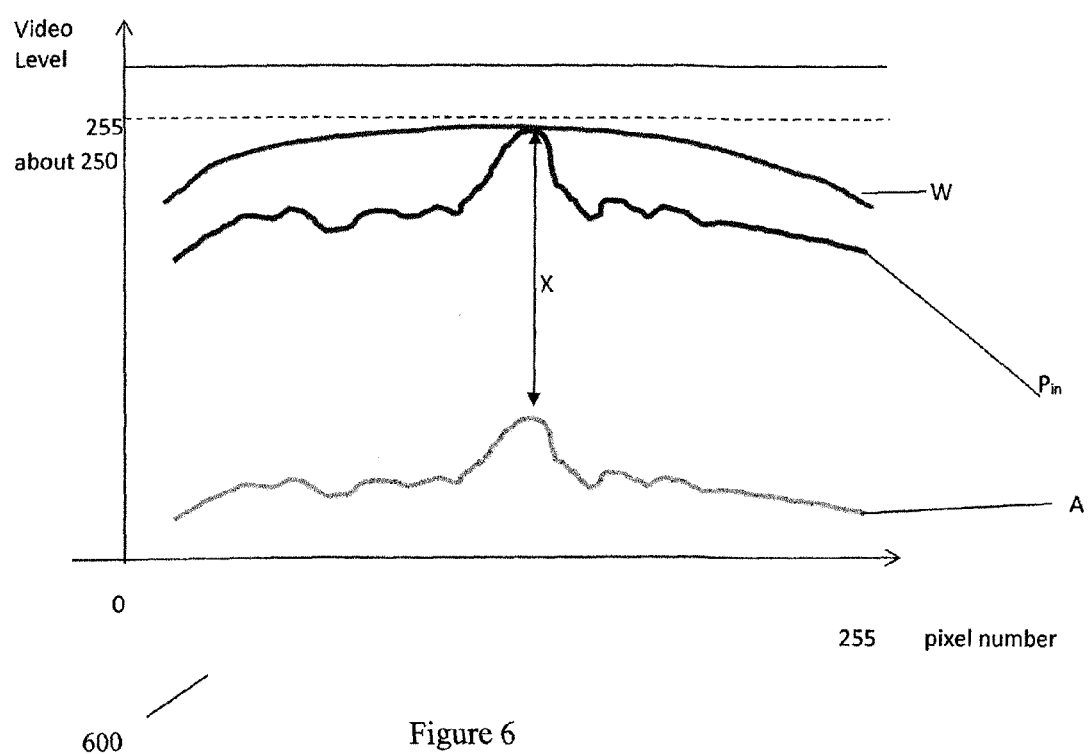
FIG. 6 is a graph depicting various video levels.

In another embodiment of the invention, there is provided a method of scanning a document with an area sensor, advantageously with uniformity correction and ambient light removal. In this embodiment, 2 frames are preferably taken during scanning. FIG. 6 is a graph, designated generally as reference number 600, depicting various video levels. With reference to FIG. 6, Ambient light data (or ambient video level) (A) is obtained in the first frame. In the second frame, data ($P_{in}$) comprising both ambient light and flash light is obtained. Uniformity correction with ambient light removal can be applied to the image of the second frame using Ambient light data (A) from the first frame and a reference white paper data (or reference flash video level) (W) that is obtained, for example, during manufacturing.

A corrected video level ($P_0$) can be obtained as follows:

$$P_o = \frac{P_{in} - A}{W - A} \times 255. \quad (10)$$

($P_{in}$–A) is denoted as X in FIG. 6, which is the contribution from the flash light only. In other words, the ambient component is substantially removed. (W–A) denotes the uniformity correction. Assuming 8 bits, the 255 video level is the white-most point. The target document to be scanned is preferably not moved and $P_{in}$ is not saturated.

Figure 7:
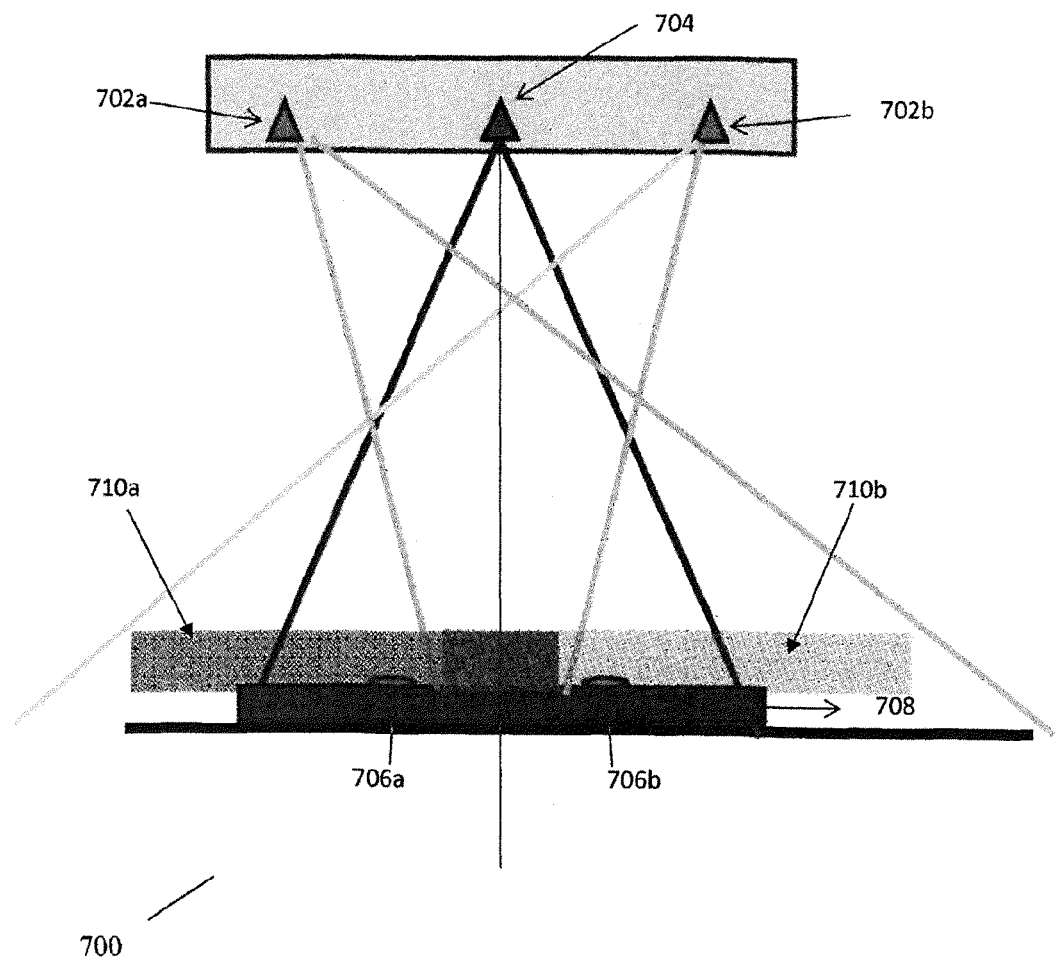
FIG. 7 is a schematic illustrating a set-up incorporating light sources and an area sensor, according to an embodiment of the present invention.

According to another embodiment of the present invention, there is provided a method of scanning a document with an area sensor, advantageously with removal of a spot of flash light. FIG. 7 is a schematic, designated generally as reference numeral 700, illustrating a set-up incorporating light sources and an area sensor, according to the embodiment. In particular, there are two light sources 702a/b disposed at each side of an area photo sensor 704. The two light sources 702a/b are preferably at substantially the same height level with the area photo sensor 704. A plurality of frames, preferably 3 frames, are taken. For the first frame, both light sources 702a/b are off and ambient light data is obtained. For the second frame, the light source 702a is switched on while the light source 702b is switched off and image data is captured by the area photo sensor 704. A first flash spot 706a appears on a document 708 that is to be scanned. For the third frame, the light source 702b is switched on while the light source 702a is switched off and image data is captured by the area photo sensor 704. A second flash spot 706b appears on the document 708 that is to be scanned. To advantageously remove the first flash spot 706a, section B 710b of frame 2 is used. Similarly, to remove the second flash spot 706b, section A 710a of frame 3 is used. Finally, the second (with section B 710b) and third (with section A 710a) frames are integrated by any currently known methods to remove the glossy flash spot. The integrated image advantageously has no flash spots. The first frame can be used to correct the uniformity and remove the ambient light of the integrated frame (as described above).

Figure 8A:
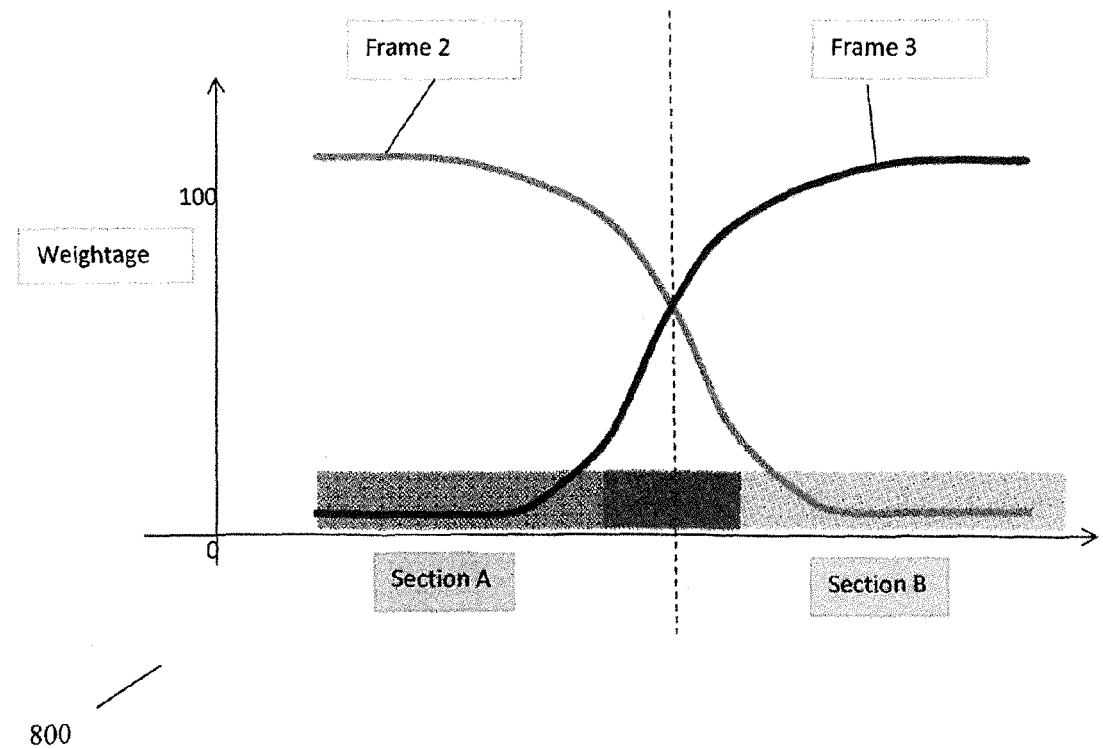
FIG. 8a is an example of a weightage distribution graph.

The first flash spot 706a from frame 2 is designated a near to zero weightage, thus substantially eliminating it from the integrated image. Similarly, the second flash spot 706b from frame 3 is designated a near to zero weightage, thus substantially eliminating it from the integrated image. FIG. 8a is an example of a weightage distribution graph, designated generally as reference numeral 800, that can be used for this embodiment of the present invention.

A second method of scanning a document with an area sensor, advantageously with removal of a spot of flash light involves using mechanical or electronics means to block the light path of the flash spots by taking one frame. In other words, different portions of a single frame are captured during exposure of different ones of a plurality of light sources. In comparison, in the first method described above, multiple frames are taken and the frames are subsequently integrated to form a single frame.

With reference to FIG. 7, in the first half of a particular frame exposure time, mechanical means (e.g.: a mechanical shutter) or electronic means, can be used to block the light path of the area photo sensor 704 looking at section B 710b while the light source 702b is switched on and light source 702a is off. In effect, the image in section A 710a is advantageously captured during the first half of the frame while flash spot 706b is not captured.

In the second half of the frame exposure time, the light path of the area photo sensor 704 looking at section A 710a is blocked while the light source 702a is switched on and light source 702a is off. In effect, the image in section B 710b is advantageously captured during the second half of the frame while flash spot 706a is not captured. This method advantageously enables the entire document to be captured by the area photo sensor 704 in one frame without any flash spots.

Figure 8B:
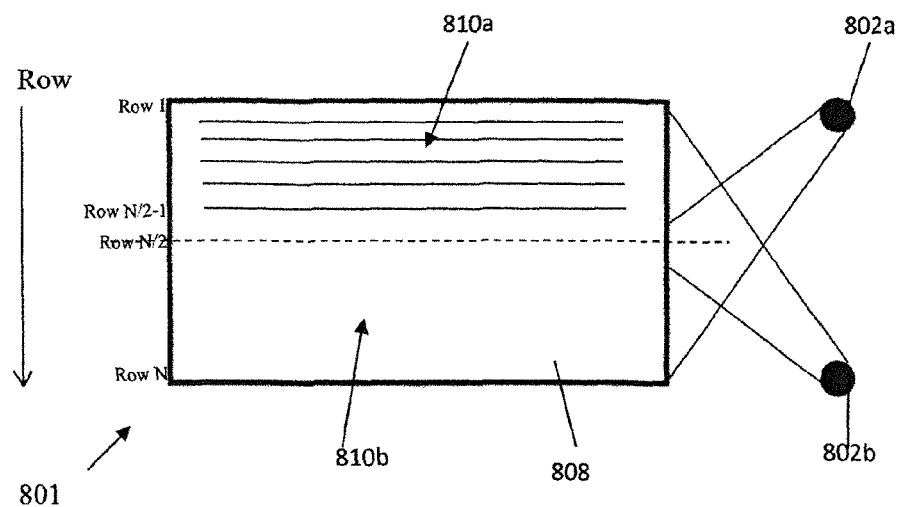
FIG. 8b is a schematic illustrating a set-up incorporating light sources and an area sensor, according to an embodiment of the present invention.

A third method of scanning a document with an area sensor, advantageously with removal of a spot of flash light involves using different light sources for different rows of the frame during the exposure time. FIG. 8b is a schematic, designated generally as reference numeral 801, illustrating a set-up incorporating light sources and an area sensor, according to the present embodiment. With reference to FIG. 8b, when the area sensor (not shown) is capturing Section A 810a (i.e. rows 1 to N/2−1), light source 802b is switched on (light source 802a is off). When the area sensor (not shown) is capturing Section B 810b (i.e. rows N/2−1 to N), light source 802a is switched on (light source 802b is off). This method advantageously enables the entire document to be captured by the area photo sensor in one frame without any flash spots.

A fourth method of scanning a document with an area sensor, advantageously with removal of a spot of flash light involves tilting the area sensor such that the flash spot appears outside the area sensor's view. Perspective correction (described below) is preferably performed on the scanned image when the area sensor is tilted. In other words, the area sensor is disposed such that it captures the scan image at an off-normal angle with respect to a document such that flash spots are removed from the scan image.

Figure 8C:
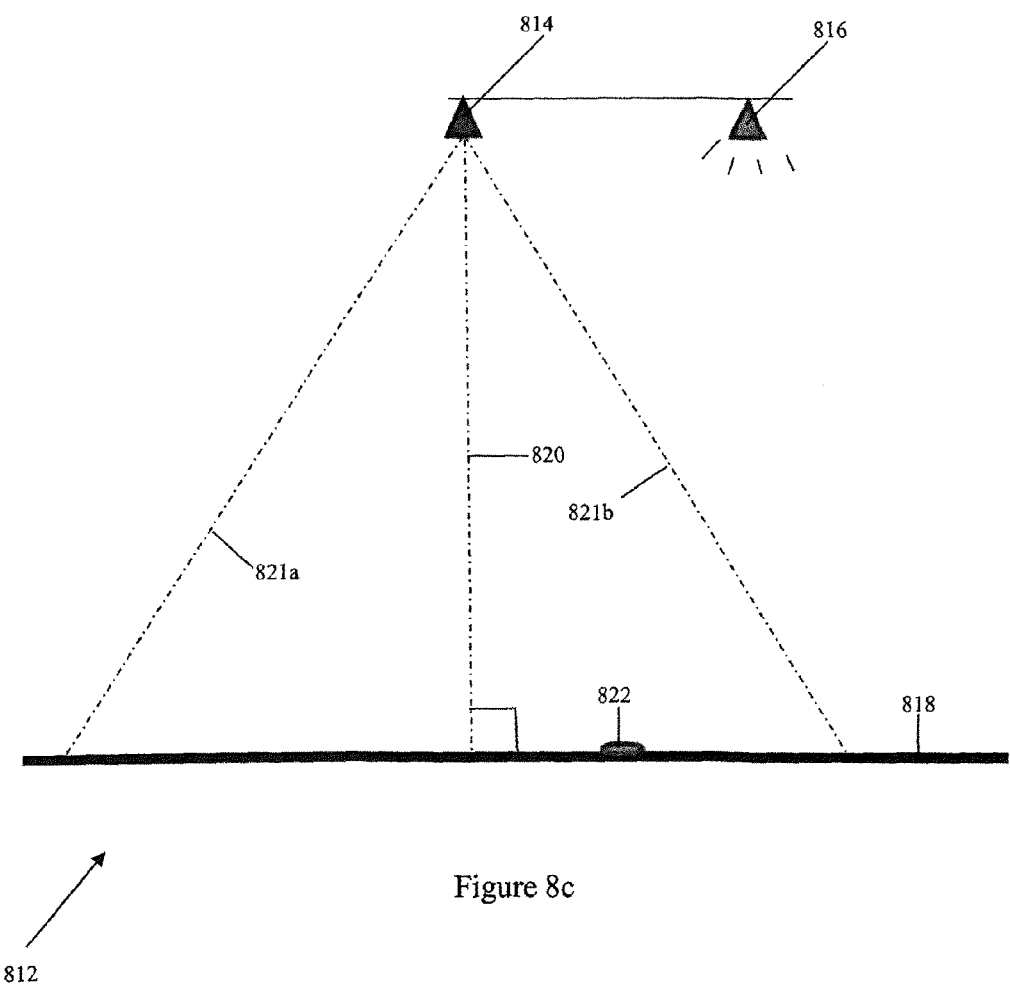
FIG. 8c is a schematic illustrating a set-up comprising an untilted light source and an area sensor, according to an embodiment of the present invention.

FIG. 8c is a schematic, designated generally as reference numeral 812, illustrating a set-up comprising an untilted light source and an area sensor, according to an embodiment of the present invention. The area sensor 814 and the light source 816 are disposed above and parallel to a document 818 which is to be scanned. In other words, a centre light path 820 of the area sensor 814 is orthogonal to the document 818. The light source 816 produces a flash spot 822 on the document 818 within the area sensor's 814 view (indicated by boundary light paths 821a and 821b), consequently causing the flash spot 822 to appear on a scanned image.

Figure 8D:
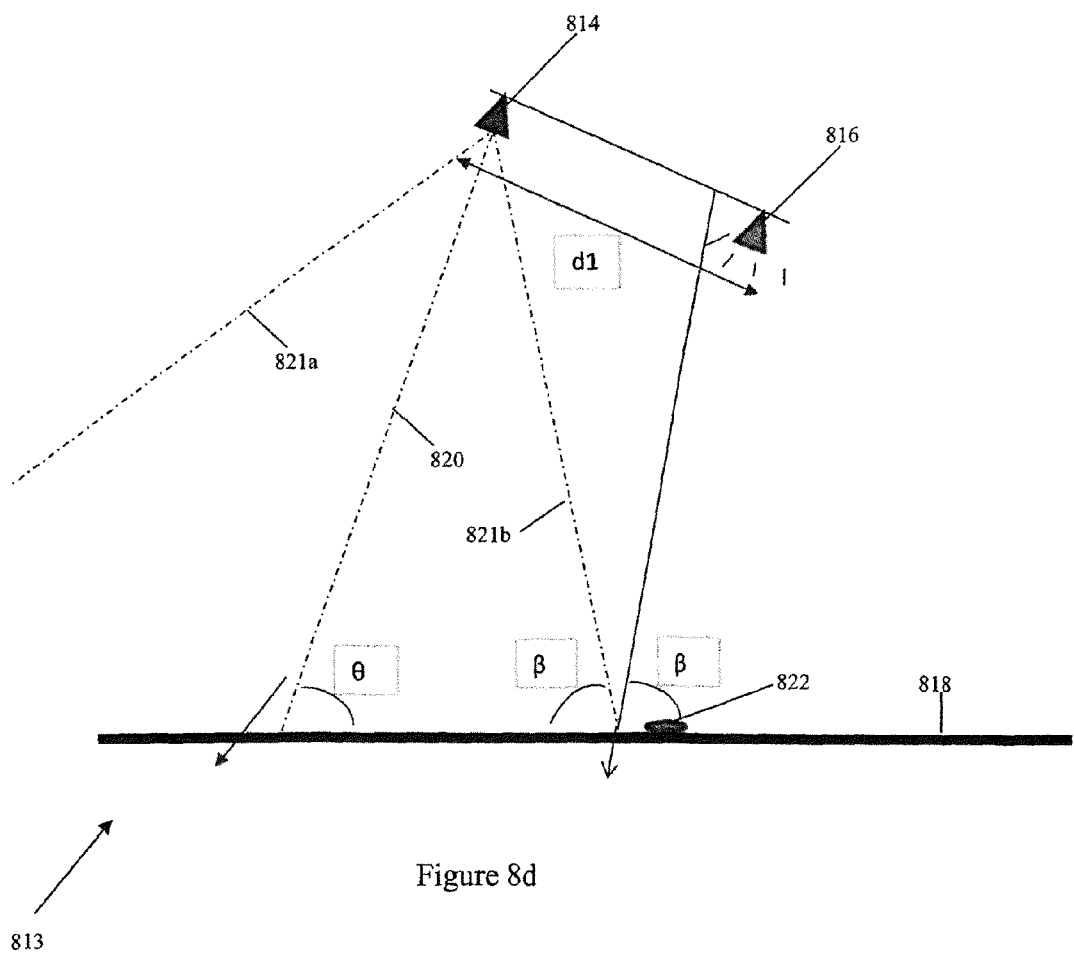
FIG. 8d is a schematic illustrating a set-up comprising a tilted light source and area sensor, according to an embodiment of the present invention.

FIG. 8d is a schematic, designated generally as reference numeral 813, illustrating a set-up comprising a tilted light source and area sensor, according to an embodiment of the present invention. In contrast to FIG. 8c, in FIG. 8d, the area sensor 814 and the light source 816 are tilted such that they are no longer disposed parallel to the document 818 which is to be scanned. The tilting can be performed, for example, manually by the user or by the area sensor being mechanically tilted at an angle within the scanner body. The centre light path 820 of the area sensor 814 is not orthogonal to the document 818 but at an acute angle θ. The light source 816 produces a flash spot 822 on the document 818, but is not within the area sensor's 814 view (indicated by boundary light paths 821a and 821b). Consequently, the flash spot 822 does not appear on a scanned image.

Figure 8E:
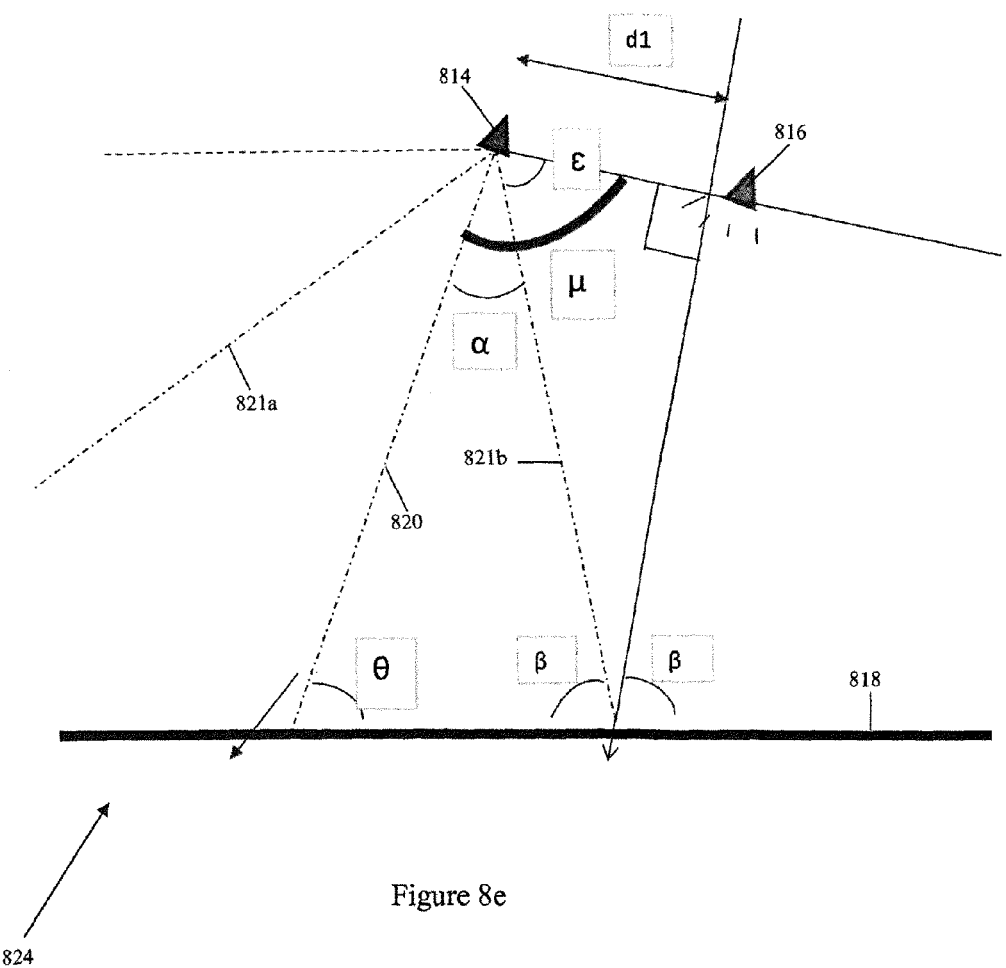
FIG. 8e is a schematic illustrating a set-up comprising a tilted light source and area sensor, according to an embodiment of the present invention.

FIG. 8e is a schematic, designated generally as reference numeral 824, illustrating a set-up comprising a tilted light source and area sensor, according to an embodiment of the present invention. The area sensor 814 and the light source 816 are tilted at an angle "μ" within the scanner body. To facilitate a compact scanner body, the distance "d1" between the area sensor 814 and the light source 816 is preferably made as short as possible as follows:

μ: area sensor to scanner body angle
α: area sensor half view angle
θ: pre-determined camera tilt angle $$\beta = 180° - \theta - \alpha \quad (10a) \text{ and;}$$

$$\epsilon = 90° - (180° - 2\beta) \quad (10b)$$

Accordingly, $$\epsilon = 90° - (180° - 2(180° - \theta - \alpha))$$

$$\epsilon = 90° - (180° - 360° + 2\theta + 2\alpha)$$

$$\epsilon = 90° - (-180° + 2\theta + 2\alpha)$$

$$\epsilon = 90° + 180° - 2\theta - 2\alpha$$

$$\epsilon = 270° - 2\theta - 2\alpha \quad (10c)$$

Also, $$\mu = \epsilon + \alpha \quad (10d)$$

Accordingly, $$\mu = 270° - 2\theta - 2\alpha + \alpha$$

$$\mu = 270° - 2\theta - \alpha \quad (10e)$$

Therefore, when "μ" is equal to (270°−2θ−α), d1 (scanner body length) is the shortest.

It will be appreciated by a person skilled in the art that a flash spot typically appears on glossy documents. For non-glossy documents, flash spots usually do not appear. Accordingly, in another embodiment of the present invention, there is provided a "dual scan angle" such that for the scanning of non-glossy documents, the area sensor can be disposed parallel (at a "first angle") to the document which is to be scanned to achieve full resolution. In other words, the centre light path of the area sensor is orthogonal to the document (similar to FIG. 8c). For the scanning of glossy documents, the area sensor is tilted at a predetermined angle ("second angle") such that it is no longer disposed parallel to the document which is to be scanned. The centre light path of the area sensor is at an acute angle with respect to the document (similar to FIG. 8 d/e).

Figure 8F:
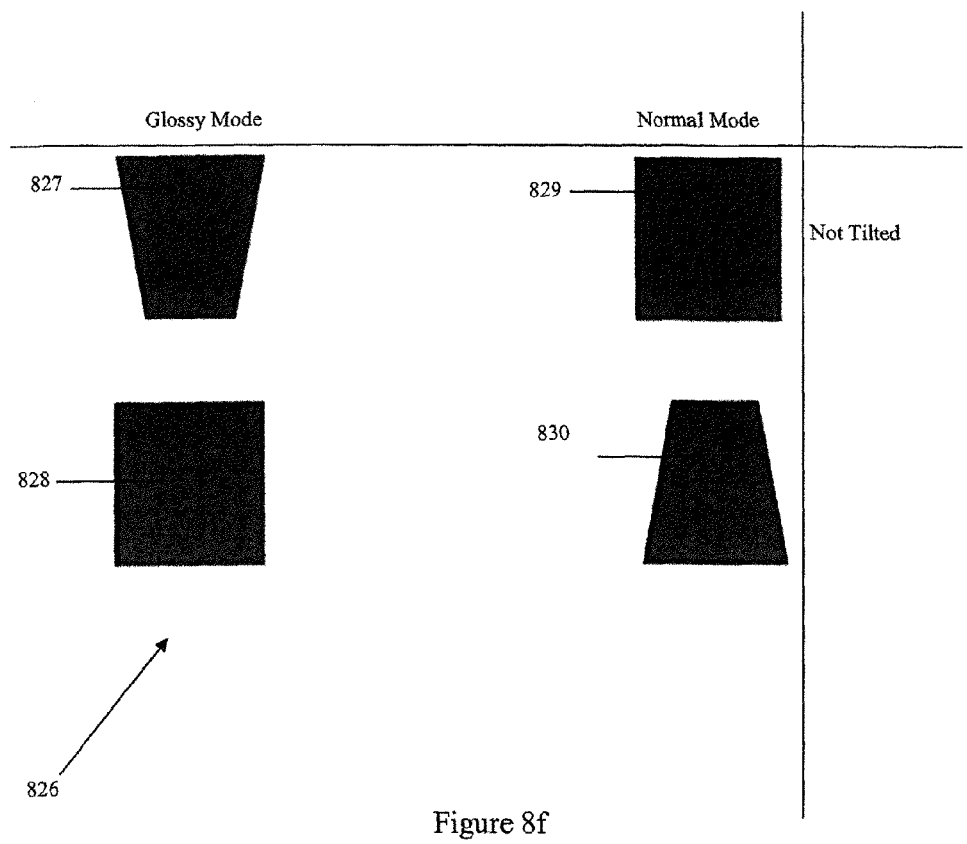
FIG. 8f is a schematic illustrating visual indicators, according to an embodiment of the present invention.

A user-selectable "normal mode" and a "glossy mode" can be implemented depending on the type of document to be scanned. An indicator can be used to warn the user if the area sensor is not in a tilted position in the "glossy" mode, or if the area sensor is in a tilted position in the "normal" mode. Such indicators can be in the form as illustrated in FIG. 8f, which is designated generally as reference numeral 826. When a user selects the "glossy mode", the indicator for "glossy mode" is turned on. If the area sensor is not in a tilted position, the indicator is in the form of a rhombus 827 which is an indication to the user that the scanner (area sensor) is to be tilted. Once the area sensor is tilted to a sufficient angle, the indicator changes to a square 828, indicating that the area sensor is sufficiently tilted. Similarly, in the "normal mode" (scanning of non-glossy documents), if the area sensor is not in a tilted position, the indicator is in the form of a square 829. Once the area sensor is tilted, the indicator changes to a rhombus 830, indicating that the area sensor is tilted. It will be appreciated by a person skilled in the art that other types of indicators, including audio and visual indicators (e.g. lines, dots, etc) may also be used.

Figure 8G:
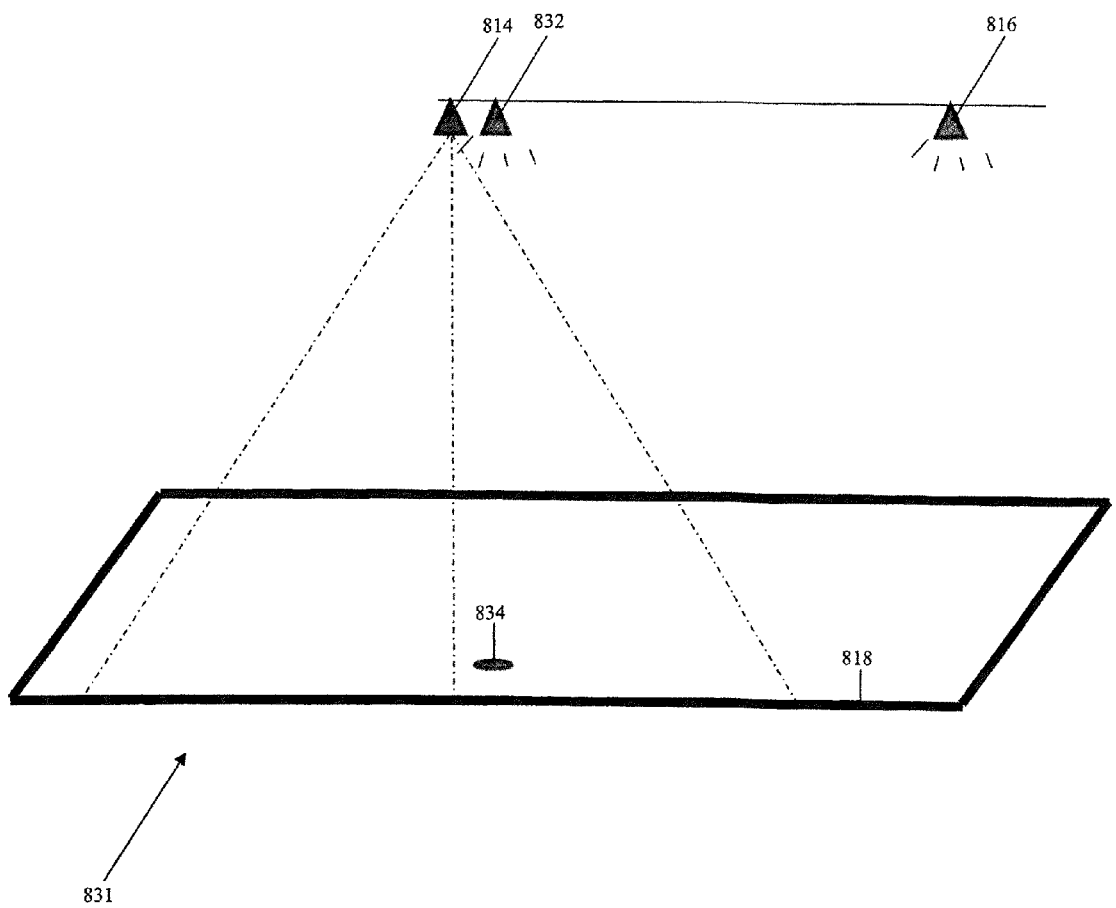
FIG. 8g is a schematic illustrating a set-up comprising light sources and an area sensor, according to the present embodiment.

In a further embodiment of the present invention, detection of a flash spot on a glossy document can be performed to provide an automatic switching between the "glossy" and "normal" mode. FIG. 8g is a schematic, designated generally as reference numeral 831, illustrating a set-up comprising light sources and an area sensor, according to embodiments of the present invention. In addition to the area sensor 814 and scanning light source 816, an extra light source 832 is disposed proximate to the area sensor 814. In order to detect a flash spot, the scanning light source 816 is turned off. A low exposure time is set and the extra light source 832 is turned on. If the document 818 is of a glossy type, a flash spot 834 appears and the area sensor 814 detects a video level of 255. Accordingly, the "glossy mode" can automatically be switched on for the scanning of a glossy document.

A fifth method of scanning a document with an area sensor, advantageously with removal of a spot of flash light involves a plurality of light sources, each having an associated blocking means, wherein the blocking means blocks the associated light source in a direction of a flash spot, such that flash spots are removed from the scan image.

Figure 8H:
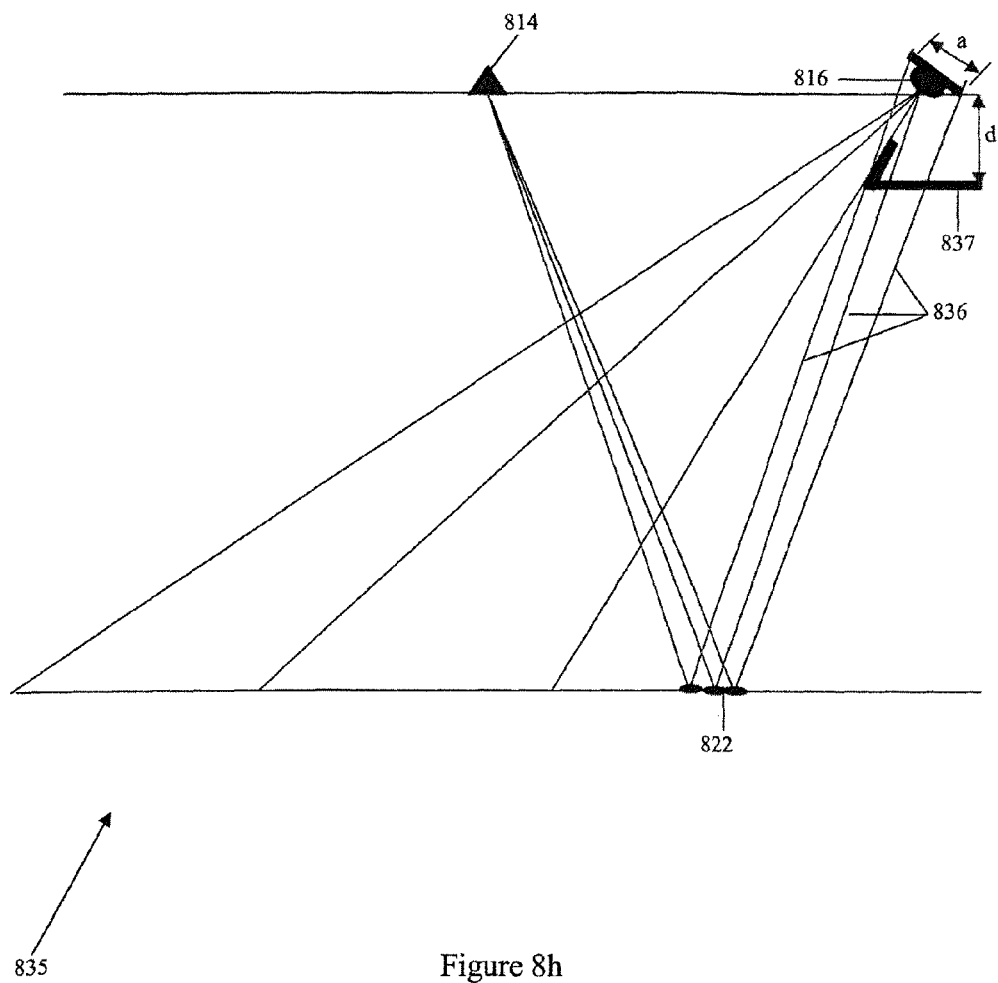
FIG. 8h is a schematic illustrating a set-up comprising a light blocking means according to an embodiment of the invention.

FIG. 8h is a schematic, generally designated as reference numeral 835, illustrating a set-up comprising a light blocking means, according to an embodiment of the invention. The light blocking means 837 is disposed below the light source 816 to advantageously block light rays 836 from reaching a glossy document so that flash spots 822 do not appear on the document surface during scanning by an area sensor 814.

In addition to blocking light from the light source 816, the light blocking means 837 can block secondary diffused light from the scanner housing, PCB board, LED lens/glass and the like.

Figure 8I:
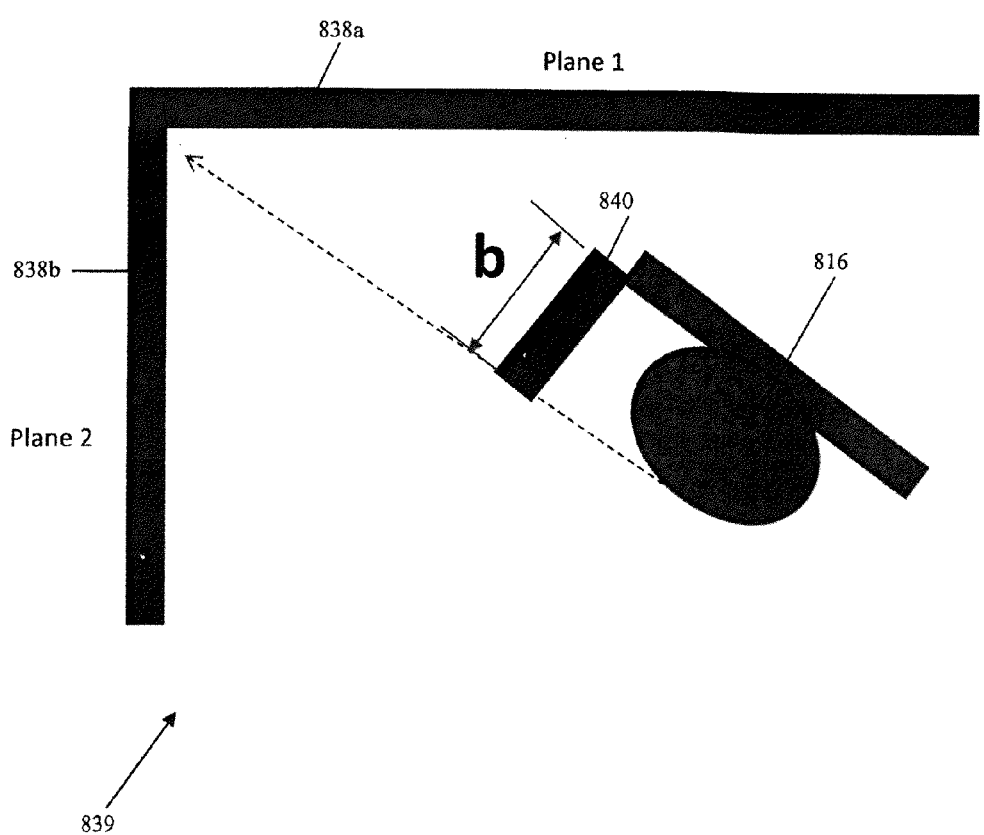
FIG. 8i is a schematic illustrating a light blocking means, according to an embodiment of the invention.

FIG. 8i is a schematic, generally designated as reference numeral 839, illustrating a light blocking means, according to an embodiment of the invention. The light source 816 can be surrounded by a light blocking means, here in the form of a barrier 840 of length b to substantially prevent light from reaching plane 838a, but allowing light to reach plane 838b.

Figure 8J:
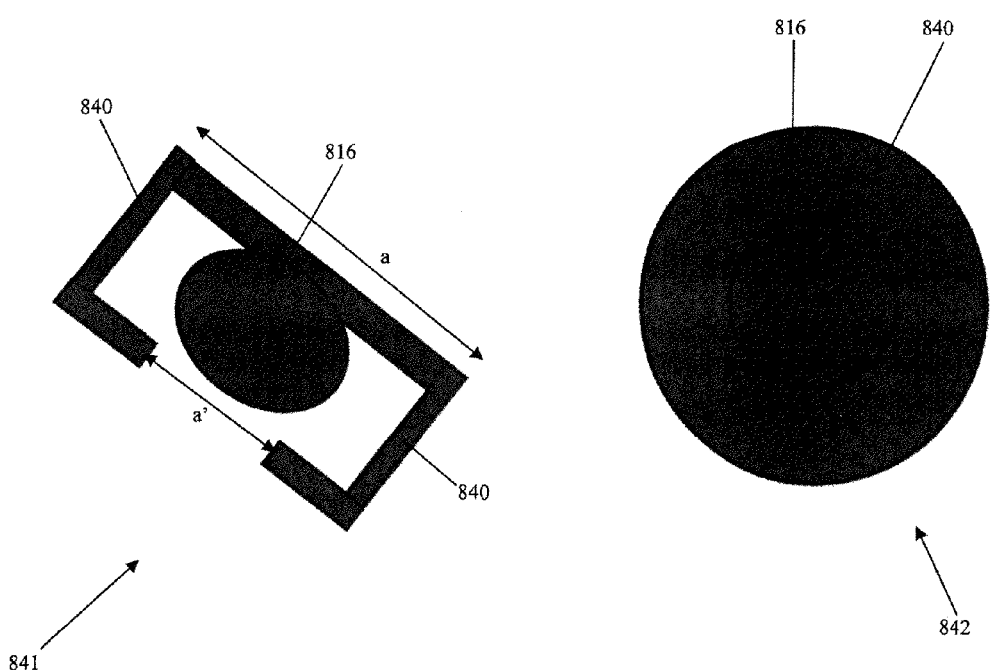
FIG. 8j is a schematic illustrating a light blocking means, according to an embodiment of the invention.

The light blocking means can also be in the form of a housing 840, surrounding a light source 816, an example of which is shown in FIG. 8j. The left schematic 841 is a cross sectional view of such a housing while the right schematic 842 is a perspective front view of such a housing. The housing 840 acts as an aperture to reduce the size of the light source (from a to a') while substantially maintaining the same level of luminance. As the size of the light source 816 (denoted as "a") decreases, the distance "d" between the light source and the blocking means is reduced, and vice versa. A smaller light source is desirable so that the distance "d" can be reduced to facilitate the construction of a smaller and more compact scanner.

Figure 8K:
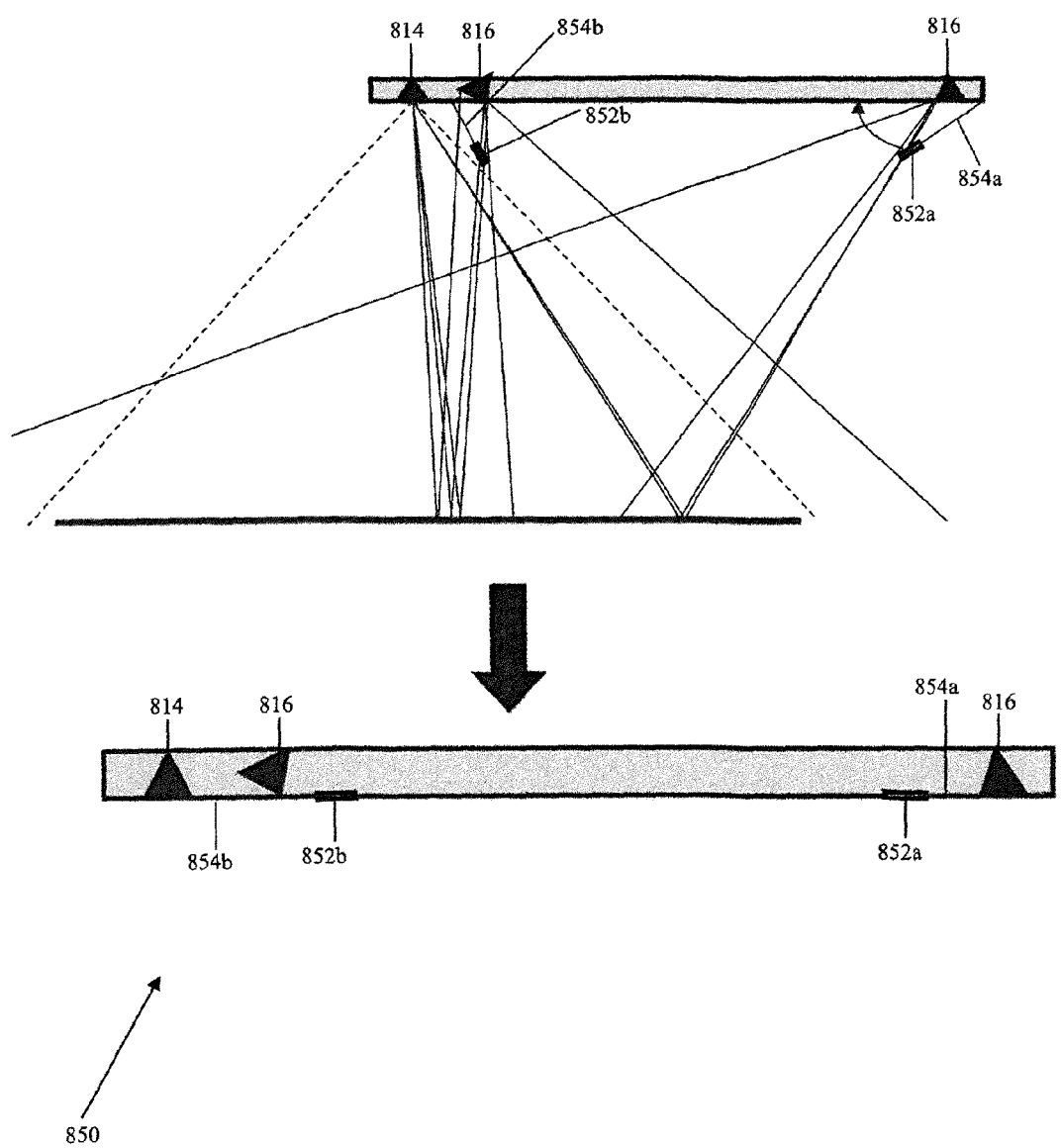
FIG. 8k is a schematic illustrating a set-up comprising means for partially blocking a light source, according to another embodiment of the invention.
Figure 8L:
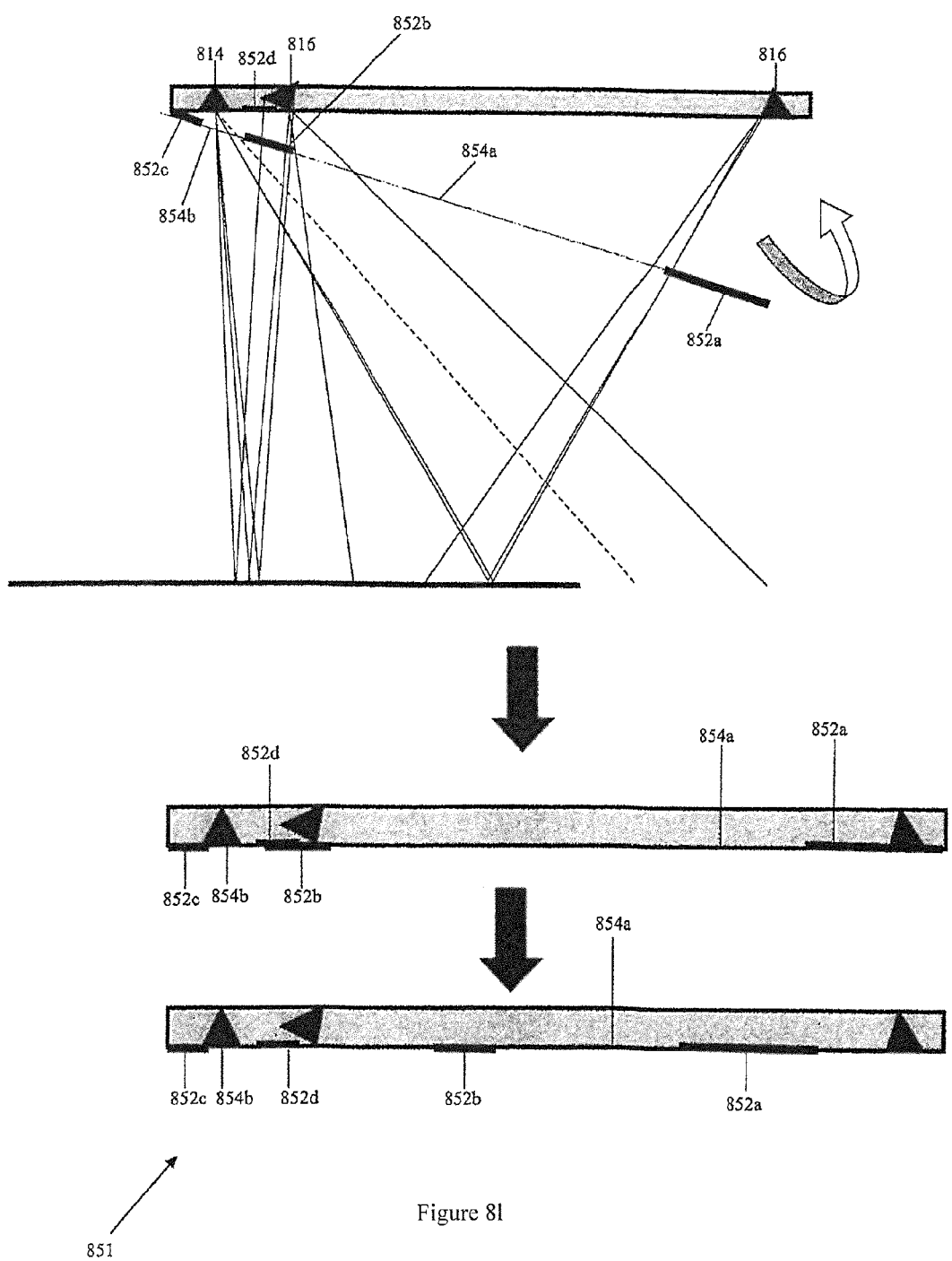
FIG. 8l is a schematic illustrating an alternative set-up comprising means for partially blocking a light source, according to an embodiment of the invention.

FIG. 8k is a schematic, generally designated as reference numeral 850, illustrating a set-up comprising means for partially blocking a light source, according to another embodiment of the invention. The blocking means comprises transparent windows 854a/b that can allow light to pass through and barriers 852a/b that substantially prevent light from passing through. The barriers 852a/b are similar to those described above. The blocking means is disposed below the light sources 816 and can be pivoted upwards to enable storage within the scanner body when not in use (as shown in the lower portion of FIG. 8k).

Figure 8M:
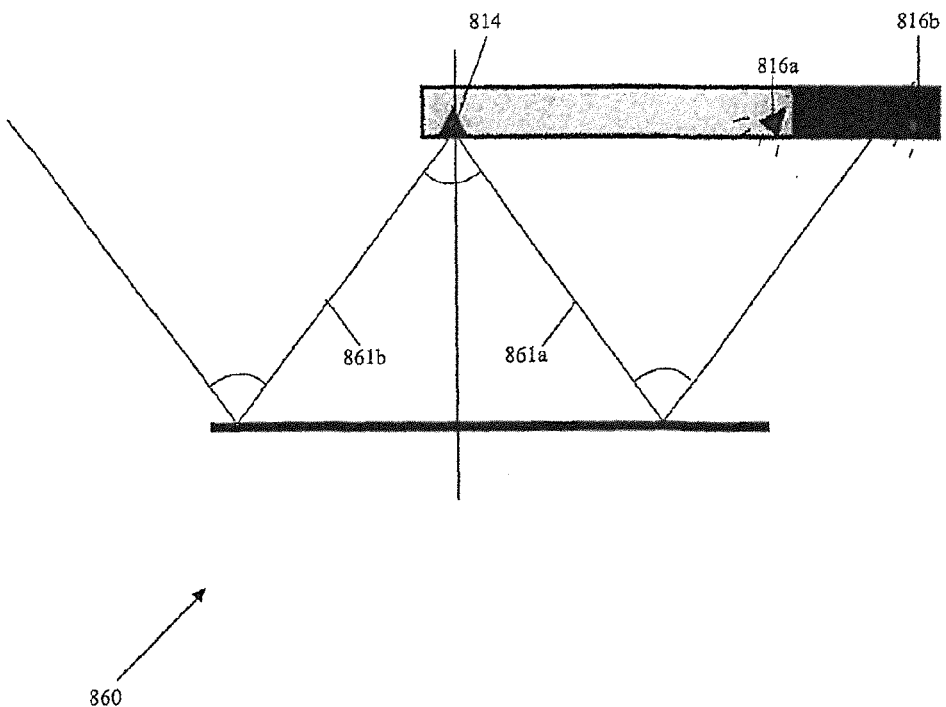
FIG. 8m is a schematic illustrating a set-up for adjusting the position of a light source, according to an embodiment of the invention.

FIG. 8m is a schematic, generally designated as reference numeral 851, illustrating an alternative set-up comprising means for partially blocking a light source, according to an embodiment of the invention. The blocking means comprises transparent windows 854a/b and barriers 852a/b/c/d. The barriers 852a/b/c/d are similar to those described above. The blocking means can be pivoted upwards to enable storage with the scanner body. Further, during storage, the barriers 852a/b can be configured to move to alternate positions so that the light source 816 is not obstructed when stored within the scanner body (as shown in the lower portion of FIG. 8m).

Figure 8N:
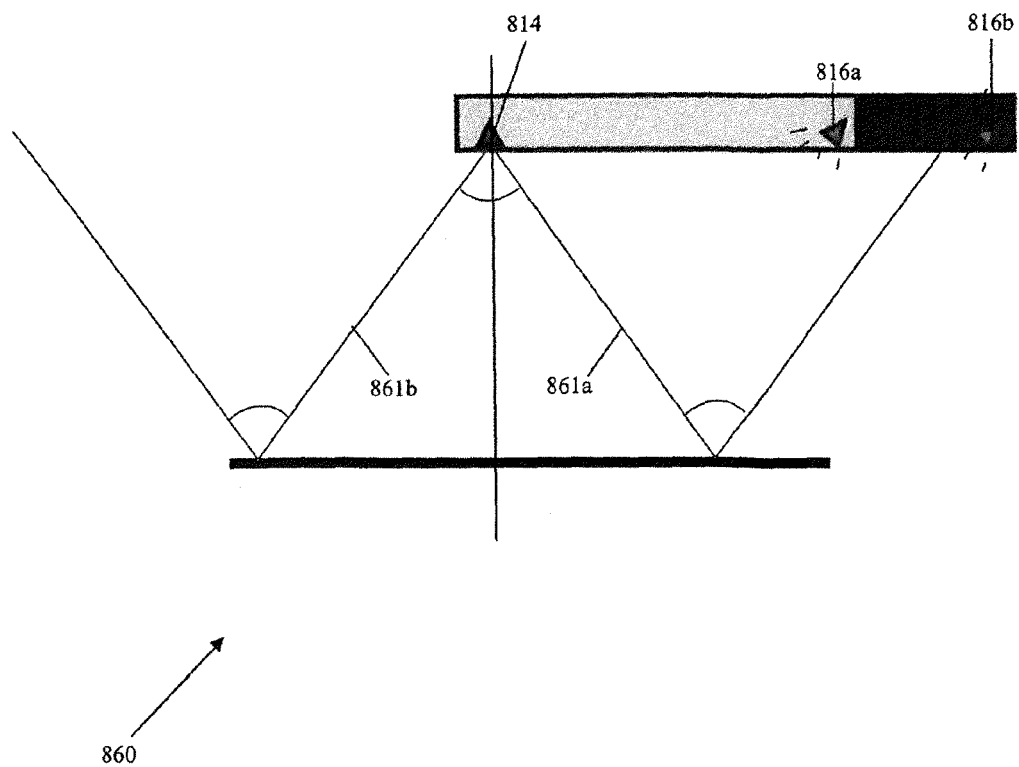

A sixth method of scanning a document with an area sensor, advantageously with removal of a spot of flash light involves moving a light source to a position wherein the resulting flash spot is out of the viewing angle of the area sensor. FIG. 8n is a schematic, generally designated as reference numeral 860, illustrating a set-up for varying the position of a light source, according to an embodiment of the invention. During the scanning of non-glossy documents, a light source can be at a position 816a which is proximate to the area sensor 814. During the scanning of glossy documents, the light source can be extended horizontally to position 816b which is at a position further away from the area sensor 814 compared to position 816a. At position 816b, the light source produces a flash spot outside the viewing angle (denoted by light paths 861a/b) of the area sensor 814 such that flash spots advantageously do not appear on the scanned image.

According to another embodiment of the present invention, there is provided a method of scanning a document with an area sensor, advantageously with perspective correction, rotation correction, automatic cropping and/or automatic orientation.

Some area sensors are handheld and there may be difficulties in rotational and perspective alignment, for example, when the device comprising the area sensor is not held directly above and parallel to the document to be scanned. Applying perspective and rotation correction can produce scanned images similar to those of a flatbed scanner.

An auto cropping algorithm can determine the edges of the scanned document and crop it out from the background. An automatic orientation algorithm can determine whether the document is in portrait or landscape orientation and adjust the scanned imaged into the same orientation.

Figures 9A, 9B:
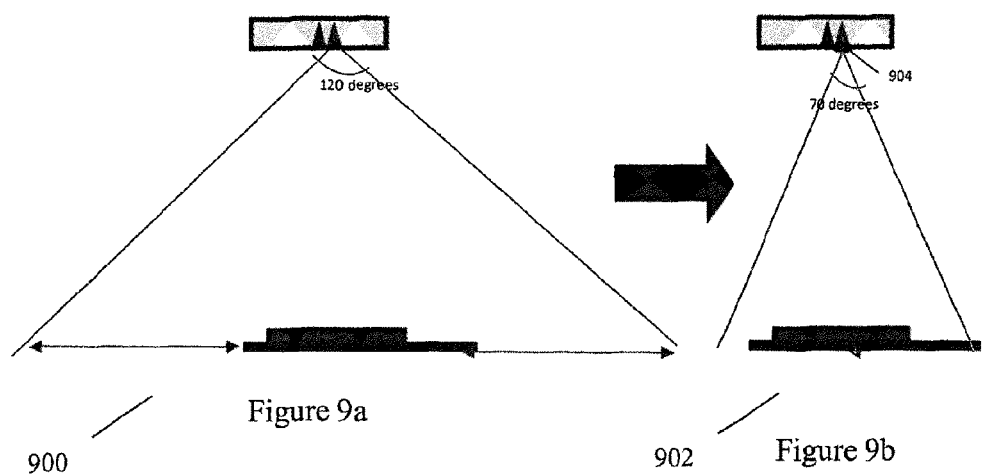
FIGS. 9a and b are schematic diagrams illustrating light source angles before and after a lens is placed after the light source.

Commercially available LED flashes typically provide a 120 degree light source angle, as shown in FIG. 9a. During scanning, this relatively large light source angle results in wasted light energy. Moreover, given a fixed light luminosity, as the area to be illuminated gets bigger, luminance drops.

Accordingly, in another embodiment of the present invention, there is provided a light source lens 904 that can provide substantially uniform light luminance at different scan distances and perspectives. The light source lens is disposed after the light source and can also concentrate the light power into a smaller scan area, as shown in FIG. 9b.

Figure 10B:
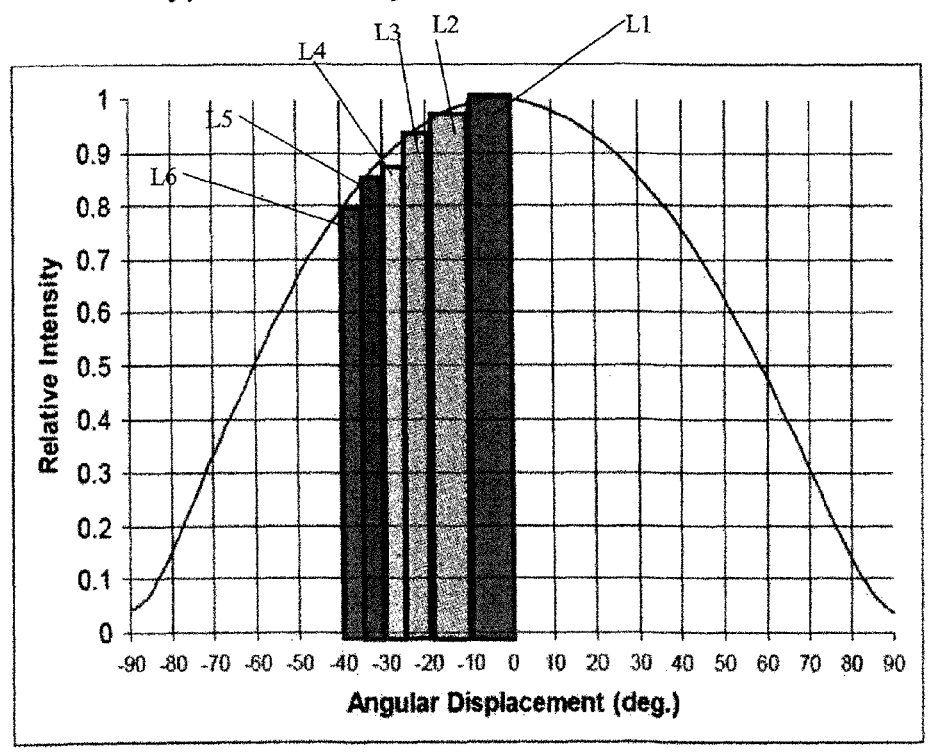
FIG. 10b is graph illustrating a typical light intensity distribution as angular displacement varies.

FIG. 10a is a diagram depicting the light luminance profile on a scan area. The scan area is divided into 6 circular zones, each with an area denoted as L1, L2 . . . L6 and a corresponding radius r1, r2 . . . r6. FIG. 10b is graph illustrating a typical light intensity distribution as angular displacement varies. Superimposed on FIG. 10b is bar chart indicating the intensity corresponding to the 6 zones of FIG. 10a. The lens is designed such that the light luminance at the 6 zones are substantially uniform as indicated in FIG. 10b.

With reference to FIG. 10a, if the radius of the innermost circle r1 is fixed, the value of the radius of the second innermost circle r2 can be determined using the equation:

$$L1/L2 = (\pi \cdot r1^2)/(\pi \cdot r2^2 - \pi \cdot r1^2) = r1^2/(r2^2 - r1^2)$$

$$L1(r2^2 - r1^2) = L2 \cdot r1^2$$

$$L1 \cdot r2^2 = L1 \cdot r1^2 + L2 \cdot r1^2$$

$$L1 \cdot r2^2 = (L1 + L2)r1^2$$

$$r2/r1 = \sqrt{((L1+L2))/L1}$$

$$\therefore r2 = (\sqrt{((L1+L2))/L1}) \cdot r1 \quad (11)$$

Similarly, if the radius of the innermost circle r1 is fixed, the radius of the third innermost circle r3, can be determined using the equation:

$$L1/L3 = (\pi \cdot r1^2)/(\pi \cdot r3^2 - \pi \cdot r2^2) = r1^2/(r3^2 - r2^2)$$

$$L1(r3^2 - r2^2) = L3 \cdot r1^2$$

$$L1 \cdot r3^2 = L1 \cdot r2^2 + L3 \cdot r1^2$$

$$L1 \cdot r3^2 = L1((L1+L2)/L1) \cdot r1^2 + L3 \cdot r1^2$$

$$L1 \cdot r3^2 = (L1+L2)r1^2 + L3 \cdot r1^2$$

$$L1 \cdot r3^2 = (L1+L2+L3)r1^2$$

$$r3/r1 = \sqrt{((L1+L2+L3))/L1}$$

$$\therefore r3 = (\sqrt{((L1+L2+L3))/L1}) \cdot r1 \quad (12)$$

Similarly, if the radius of the innermost circle r1 is fixed, the radius of the fourth innermost circle r4, can be determined using the equation:

$$L1/L4 = (\pi \cdot r1^2)/(\pi \cdot r4^2 - \pi \cdot r3^2)$$

$$L1/L4 = r1^2/(r4^2 - r3^2)$$

$$L1(r4^2 - r3^2) = L4 \cdot r1^2$$

$$L1 \cdot r4^2 = L1 \cdot r3^2 + L4 \cdot r1^2$$

$$L1 \cdot r4^2 = L1((L1+L2+L3)/L1) \cdot r1^2 + L4 \cdot r1^2$$

$$L1 \cdot r4^2 = (L1+L2+L3)r1^2 + L4 \cdot r1^2$$

$$L1 \cdot r4^2 = (L1+L2+L3+L4)r1^2$$

$$r4/r1 = \sqrt{((L1+L2+L3+L4))/L1}$$

$$\therefore r4 = (\sqrt{((L1+L2+L3+L4))/L1}) \cdot r1 \quad (13)$$

By determining the values of the radii r2, r3, r4, etc, a custom-made aspherical lens can be manufactured, for example, by plastic-molding.

According to a further embodiment of the present invention, there is provided a method of scanning a document with an area sensor, advantageously with automatic multi-cropping. For a single document, automatic-cropping can be performed by first determining the border of the document by edge detection or corner detection. Once the borders are detected, it can be automatically cropped. When there is more than one document in the scan area, it is relatively more difficult to automatically crop all the documents. For example, the number of documents present and their respective orientations are not known. Cropping and rotation for single documents as described above are extended to multiple documents as follows:

A document (A) is first introduced into the scan area. A user interface can provide a live display of the scan area, for example in the form of an LCD display screen, so that a user can know the position of the document(s) in relation to the scan area. When the document A enters the scan area and is in a fixed position, an algorithm detects, in real time, the four corners of the document A, and a scan boundary is assigned to the document A.

When a second document (B) is introduced into the scan area, the algorithm processes the scan boundary for document B (in a similar manner as described above for document A), while ignoring the scan boundary for document A. If document B enters document A's boundary, the user interface can alert the user that it is not allowed. For example, the alert can be in the form of flashing lines indicating the boundary of document A that is displayed on the LCD display screen. When the document B is in a fixed position, the algorithm detects, in real time, the four corners of the document B, and a scan boundary is assigned to the document B. These steps are repeated for subsequent documents, if any. In other words, for every new document that enters the scan area, the algorithm applies single edge detection.

Figure 10C:
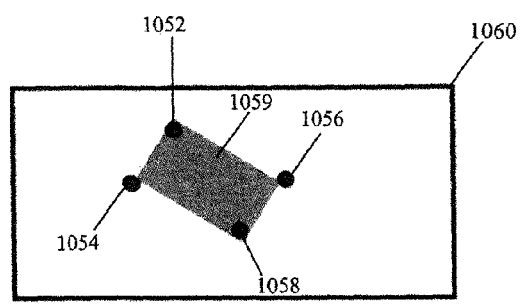
FIG. 10c is a screen capture of a graphical user interface, according to an embodiment of the present invention.

In another embodiment of the present invention, after the algorithm detects, in real time, the four corners of the document (as described above), visual markers, for example in the form of dots 1052, 1054, 1056 and 1058 as shown in FIG. 10c, can be displayed on the user interface to demarcate the four corners of the document 1059. After the four corners are detected, a scan boundary 1060 for the document 1059 is assigned (as described above).

Figure 10D:
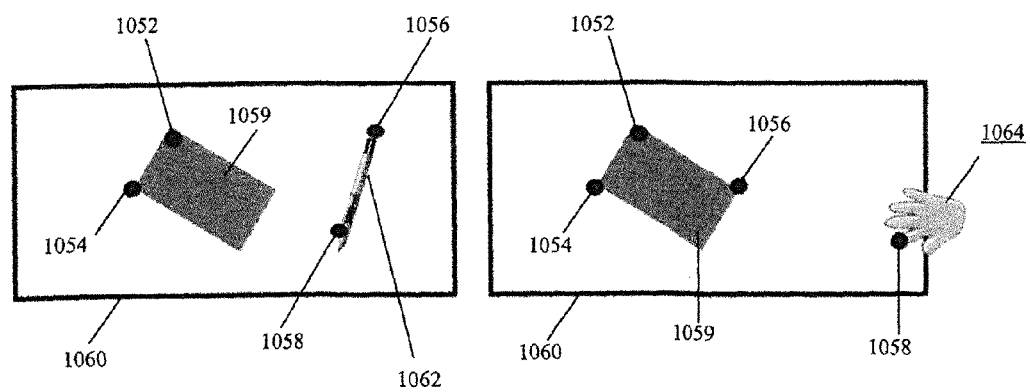
FIG. 10d is a screen capture of a graphical user interface, according to an embodiment of the present invention, showing disturbances within a scan boundary.

For some corner detection algorithms, some corners may not be detected correctly (i.e. not all the detected "corners" correspond to the actual corners of a document 1059) if there are other objects (disturbances) within the scan boundary, as illustrated in FIG. 10d. In FIG. 10d, a pen 1062 causes the corner detection algorithm to incorrectly detect a corner, a shown by the dots 1056 and 1058. In another example in FIG. 10d, a user's hand 1064 causes the corner detection algorithm to incorrectly detect a corner, a shown by the dot 1058.

With a live preview of the scan area, a user can check whether the corners of a document have been correctly detected. If not, the user can remove the disturbance(s) so that the algorithm can advantageously correctly detect the corners of the document to facilitate further processing steps such as automatic cropping. In known methods, a user usually can only see whether the right cropping is performed after the scan is complete. In this embodiment, the user can advantageously make changes using the live preview before scanning, thus saving unnecessary repeat of the scan.

Users may want to highlight and/or select specific portions of a document (data picking) rather than the entire document. The saved file size is thus reduced as only the selected portions are saved. Accordingly, there is provided a user interface for enabling distributed data in a document to be scanned and consolidated with an area sensor, according to another embodiment of the present invention. A LCD display screen is preferably incorporated so that a user can view the document to be scanned.

The user interface comprises a marquee which is a virtual boundary displayed on the LCD display screen to indicate to the user the effective area that is being selected. The aspect ratio of the marquee can be dynamically controlled and adjusted so as to allow the user to select the required portions of the document to be scanned. The scanner advantageously comprises means for assigning the adjustable marquee scan areas for data picking for the scanning.

Figure 11:
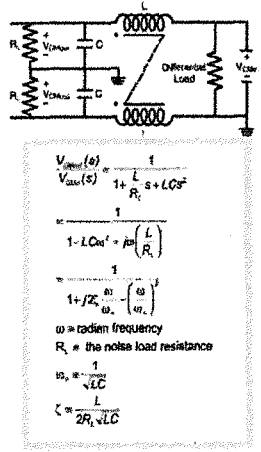
FIG. 11 is a screen capture of a document with three marquees indicating three selected regions.
Figure 11:
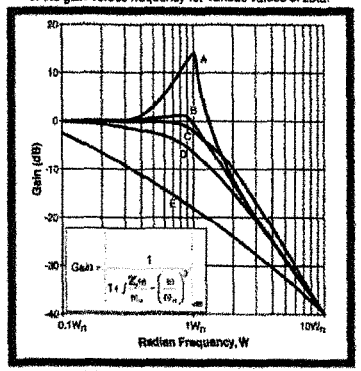

Prior to scanning, a selection of required data is performed. For example, with reference to FIG. 11, a user only wants the portions within the three marquees (boxes). The aspect ratios (heights and widths) of the marquees are different. The user can control the different aspect ratios dynamically, for example, with button(s) on the scanner unit or keyboard, which allows users to determine the width and height of the marquees. For instance, if a user presses the "left" button of a keyboard, the width of the marquee decreases, and when the "right" button is pressed, the width increases. Similarly, if a user presses the "up" button of a keyboard, the length of the marquee increases, and when the "down" button is pressed, the length decreases. Alternatively, touch screens or joysticks can be used to vary the aspect ratio of the marquees.

Alternatively, the boundary of the marquee can be configured to automatically 'grow'. An indicator such as a cross or dot is superimposed at the centre of the LCD display for a user to align to the centre of the desired data to be picked. Upon a suitable command from the user, the marquee automatically 'grows' until it detects the next high frequency content in the image (either at the sides top or bottom). High frequency content can be text, lines, or the boundary of images. In the event that the marquee grows to exceed what the user wants, the user can manually 'shrink' the marquee width or height.

After the required data is selected, the selected data is saved in a temporary clipboard. A new blank canvas is provided for the selected data to be sequentially dumped onto it. The selected data can be dumped onto the canvas at a fixed location (e.g. centre) or at the nearest empty space available. A user may also manually re-position each dumped data onto the canvas at any time. Once the first canvas is filled, a second and subsequent blank canvas can be made available for further data to be dumped into it. This process continues until the user saves the data. The application may then generate a single or multi-page document, for example in Portable Document Format (PDF), containing the canvas(es) with selected data.

Post-image processing methods known in the art such as colour correction, background removal, optical character recognition (OCR) and automatic file naming can be made available to the user after scanning is completed. For automatic file naming, OCR is carried out and different text can be append together to make up the file name of the saved document. In this way, a user does not need to manually key in the file name during saving the file.

In stark contrast, in conventional manual 'cropping' (e.g. in a mobile phone camera edit mode), after the cropped image is selected, the original scanned document is closed. To crop another image from the document, the document is re-opened. For example, with reference to FIG. 11, if a user selects the data in the 3 boxes, the original file is opened 3 times and cropped 3 times. Furthermore, the cropped image results in 3 separate files, unlike the single consolidated page of selected data according to example embodiments.

Figure 12:
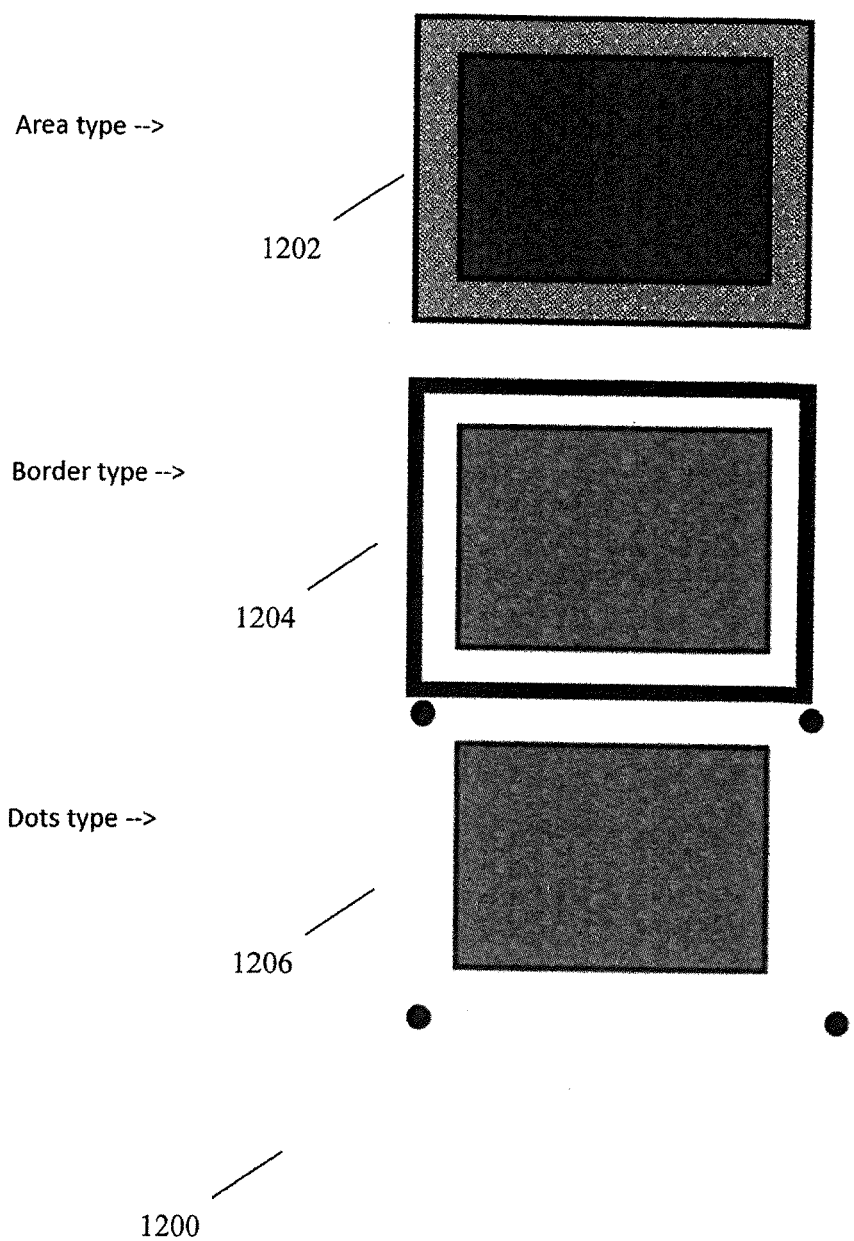
FIG. 12 is a schematic illustrating various forms of guiding lights, according to an embodiment of the invention.

When a conventional digital camera is used to capture the image of the document, a display means, usually in the form of LCD screen is typically provided so that a user is able to know the boundaries of the scan area. However, if a display means is not present, the user is unable to know whether or not the document is within the effective scan area. Accordingly, in another embodiment of the present invention, there is provided a method of scanning a document with an area sensor, advantageously with a visual guide, here in the form of a guiding light (e.g. a laser pointer or LED) superimposed on the scan area. The guiding light can be in the form of a lighted area 1202, borders 1204, or dots 1206 as illustrated in FIG. 12. In other words, the guiding light projects one or more markers indicative of a scan area.

Figure 13:
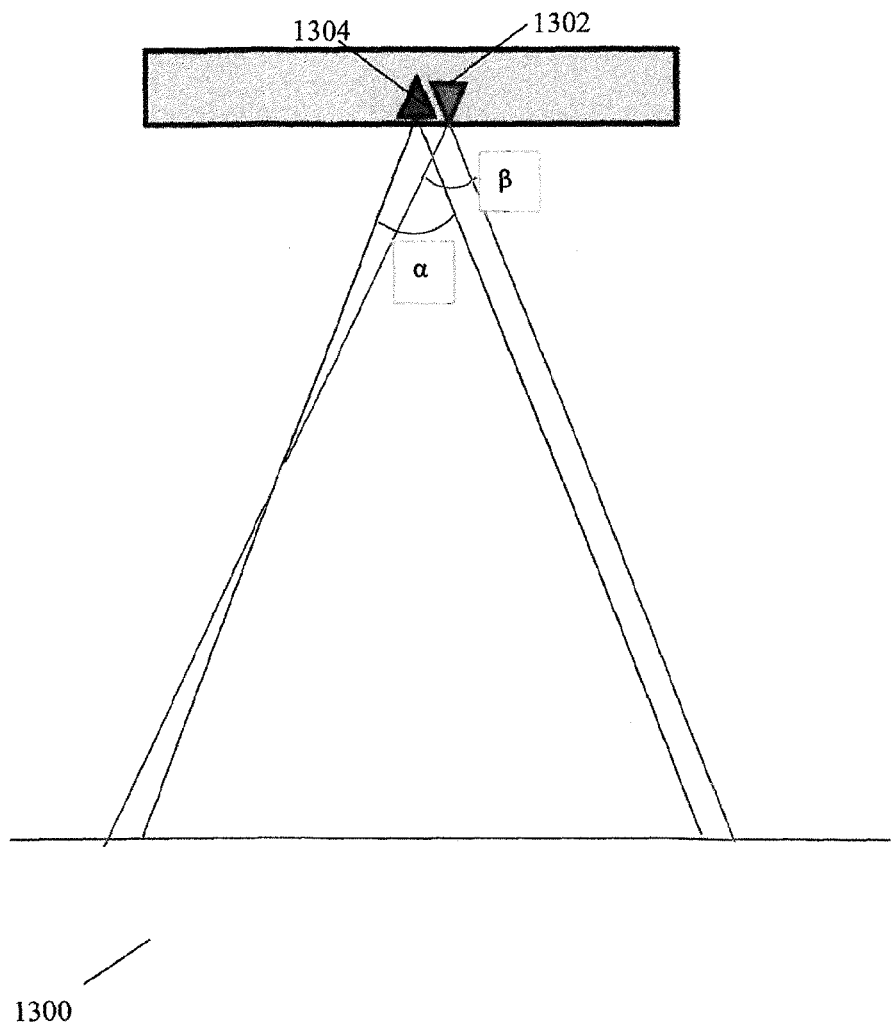
FIG. 13 is a schematic illustrating a set-up comprising a guiding light and an area sensor, according to an example embodiment.

FIG. 13 is a schematic, designated generally as reference numeral 1300, illustrating a set-up comprising a guiding light and an area sensor, according to the above mentioned example embodiment. A guiding light 1302 is preferably placed approximately near the centre of the area photo sensor 1304. The guiding light angle ($\beta$) and photo sensor view angle ($\alpha$) are preferably approximately equal so that the guiding light and photo sensor light path can substantially coincide irrespective of distances, perspective or rotation.

Some portions of the description above are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the above description, it will be appreciated that throughout the present specification, discussions utilizing terms such as "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

The invention may also be implemented as hardware modules. More particular, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

Area scanners using the associated scanning methods described above can be attached to an external device such as a mobile PC (e.g. laptops, notebooks, netbooks) using a cling-on structure as described below. The scanner can be releasably attached to the external device.

Figure 14:
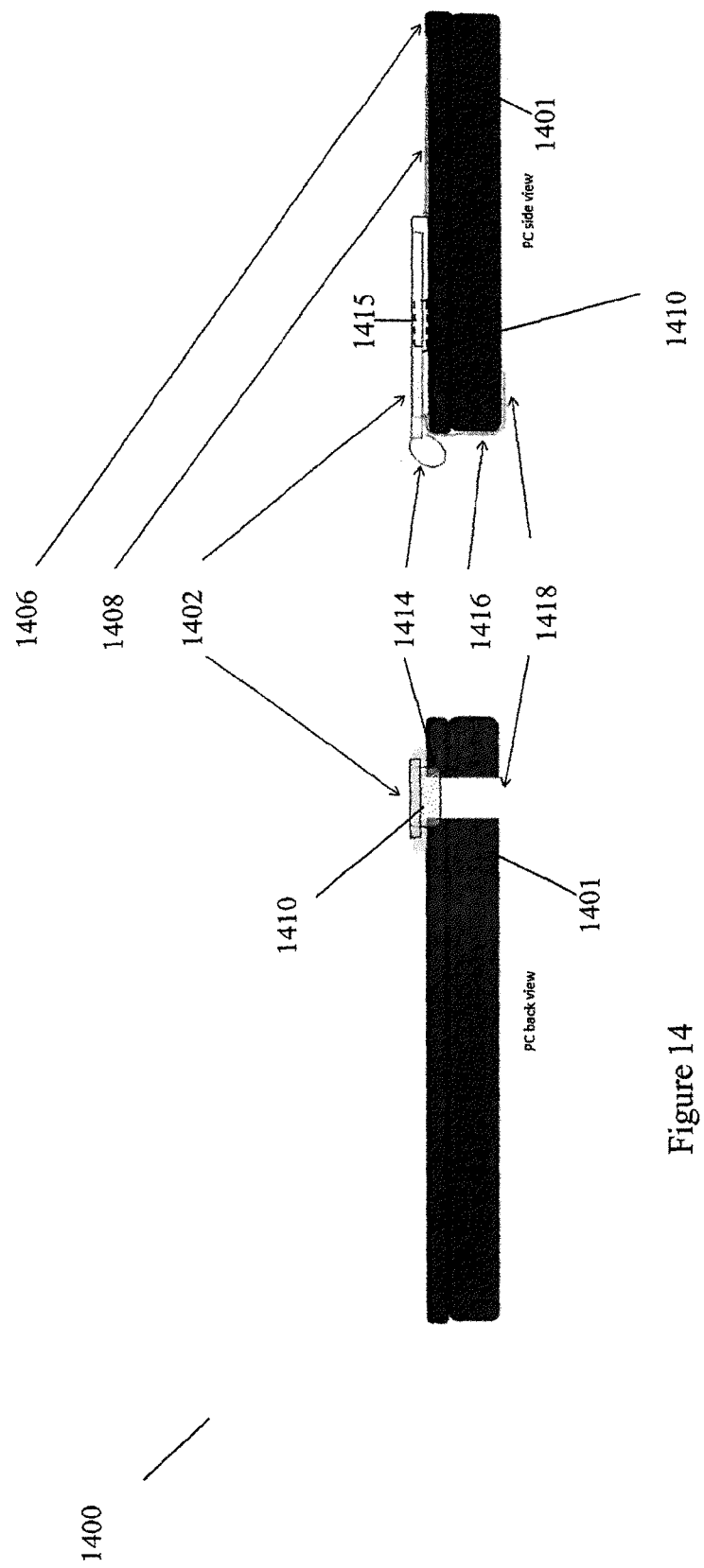
FIG. 14 is a schematic drawing of a cling-on structure, according to an embodiment of the invention.

FIG. 14 is a schematic drawing of a cling-on structure 1402 that comprises a scanner 1410 attached to a mobile PC 1401 with its lid closed, according to an embodiment of the invention. The left figure on FIG. 14 is a back view of the PC 1401 while the right figure is a side view of the PC 1401. The cling-on structure 1402 comprises a hook 1406 which is coupled to a band 1408. The hook 1406 is preferably a rubberized flexible forming hook which clings on to an edge (e.g. a lid) of the PC 1401. It can advantageously conform to any shape or thickness with minimal obstruction. It can be made of any soft material that does not cause scratches (e.g. 1 mm thick aluminium with rubberized coating). The band 1408 may be made elastic in order to prevent the cling-on structure 1402 from loosening when the lid is opened. The scanner 1410 comprises a scan head 1414 and a microprocessor 1415. One end of the scanner 1410 is coupled to the band 1408 while the other opposite end is coupled to a non-elastic band 1416. The non-elastic band 1416 is secured to the bottom of the PC 1401 by means of Velcro 1418 or the like. Velcro allows the user to remove the scanner unit at anytime and can be attached to the base of the laptop.

Figure 15:
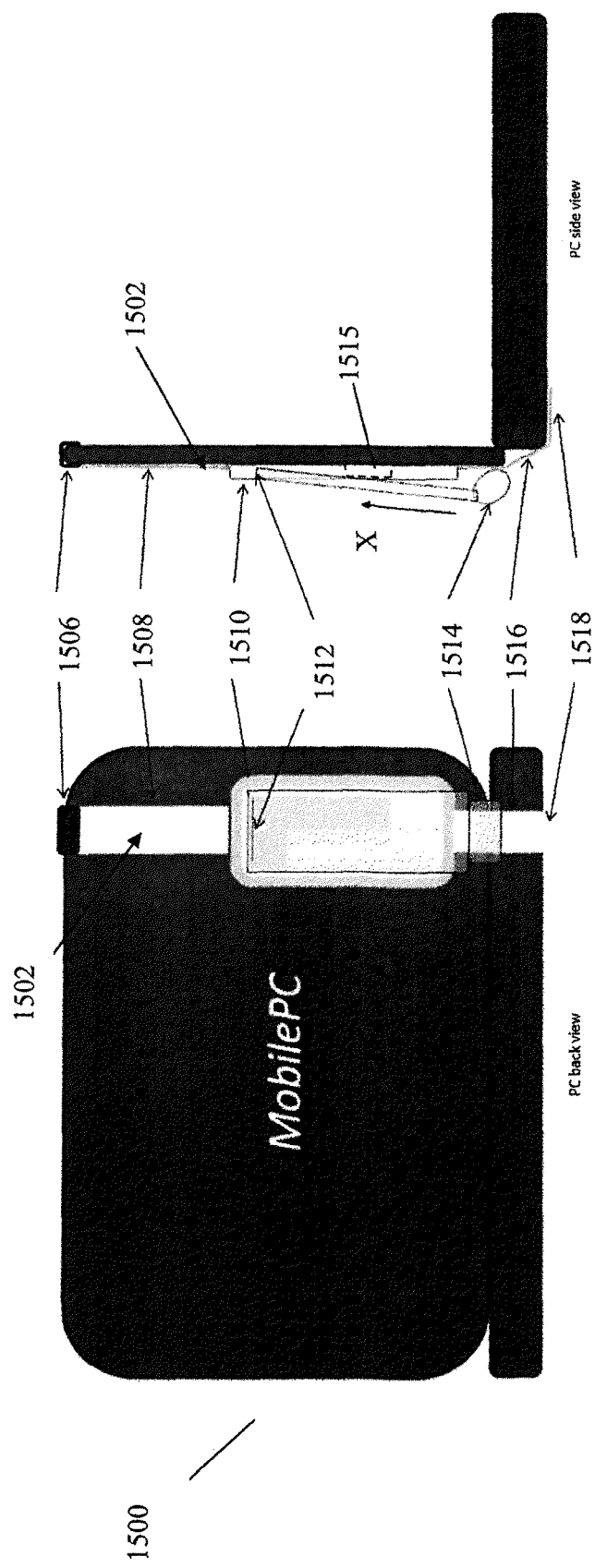
FIG. 15 is a schematic drawing of a cling-on structure, according to an embodiment of the invention.

FIG. 15 is a schematic drawing of a cling-on structure 1502 that comprises a scanner 1510 attached to a mobile PC 1501 with its lid open and the scanner 1510 not in use, according to an embodiment of the invention. The left figure on FIG. 15 is a back view of the PC 1501 while the right figure is a side view of the PC 1501. Similarly to Figure A above, the cling-on structure 1502 comprises a rubberized flexible hook 1506 which is coupled to a band 1508. The scanner 1510 comprises a scan head 1514, a microprocessor 1515, a first hinge 1512 and a second hinge (not shown). One end of the scanner 1510 is coupled to the band 1508 while the other opposite end is coupled to a non-elastic band 1515. The non-elastic band 1515 is secured to the bottom of the PC 1501 by means of Velcro 1518 or the like.

Figure 16:
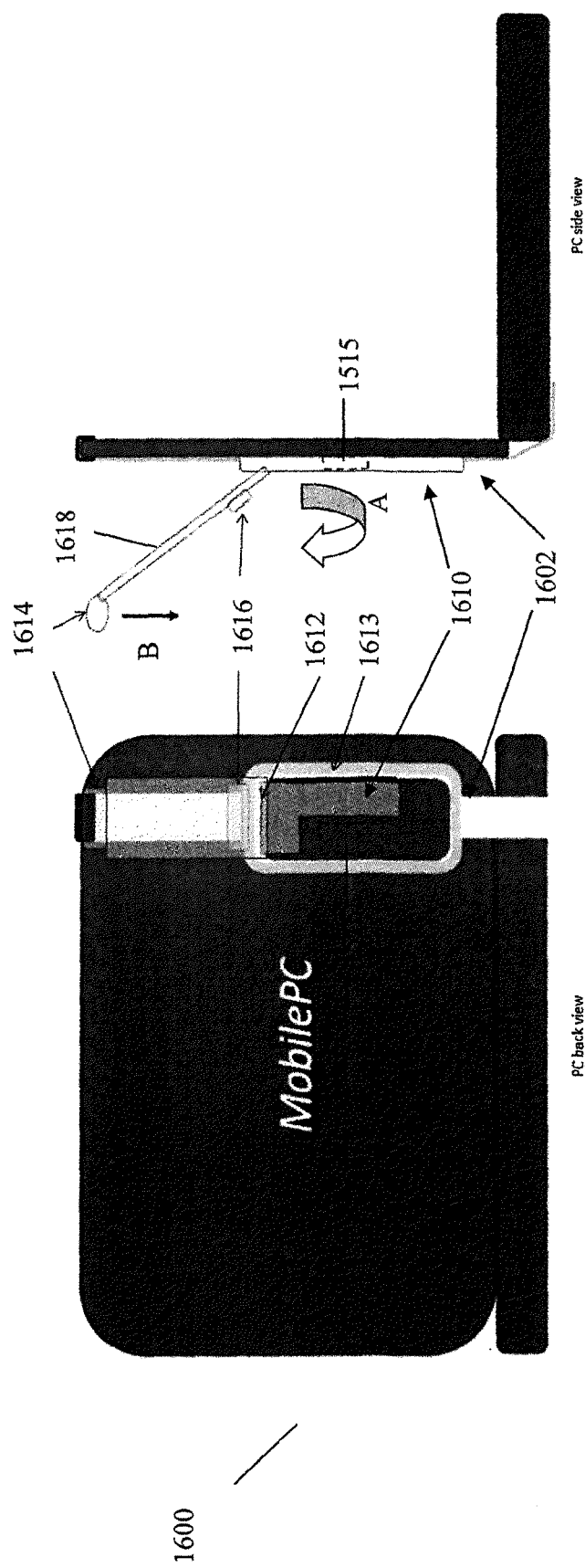
FIG. 16 is a schematic drawing of a cling-on structure, according to an embodiment of the invention.

FIG. 16 is a schematic drawing of a cling-on structure 1602 that comprises a scanner 1610 attached to a mobile PC 1601 with its lid open and the scanner 1610 in use, according to an embodiment of the invention. The left figure on FIG. 16 is a back view of the PC 1601 while the right figure is a side view of the PC 1601. The scanner 1610 comprises a scan head 1614, a microprocessor 1615, a light source 1616 and a first hinge 1612 that allows the lid 1618 of the scanner to pivot about the width of the scanner 1610 so that the lid can swing up as shown in the direction of arrow A. Documents to be scanned are placed below the scan head 1614 and the scanning direction is in the direction of arrow B.

Figure 17:
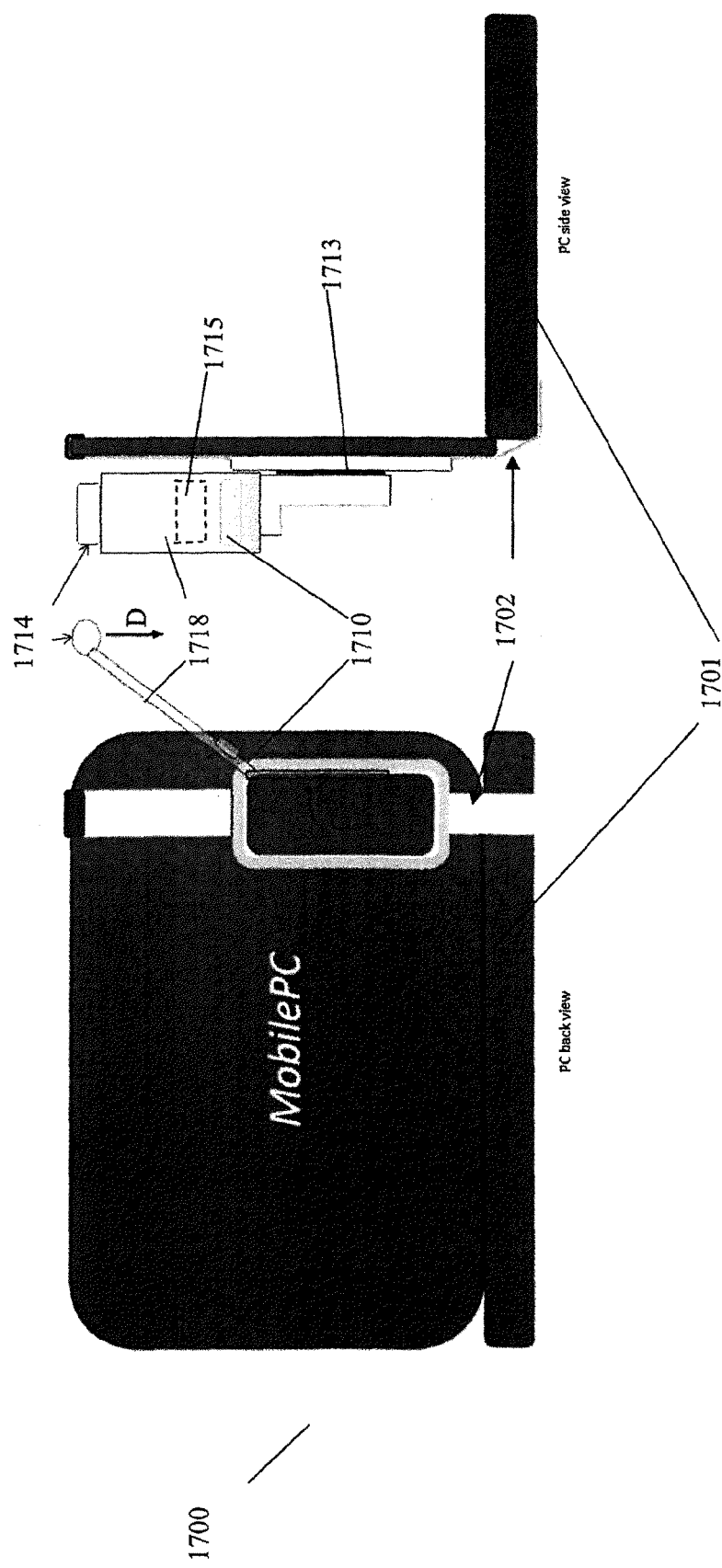
FIG. 17 is a schematic drawing of a cling-on structure, according to an embodiment of the invention.

FIG. 17 is a schematic drawing of a cling-on structure 1702 that comprises a scanner 1710 attached to a mobile PC 1701 with its lid open and the scanner 1710 in use, according to an embodiment of the invention. The left figure on FIG. 17 is a back view of the PC 1701 while the right figure is a side view of the PC 1701. The scanner 1710 comprises a scan head 1714, a microprocessor 1715 and a second hinge 1713 that allows the lid of the scanner 1717 to pivot along the length of the scanner body so that the lid 1717 can swing open as shown in the direction of arrow C. Documents to be scanned are placed below the scan head 1714 and the scanning direction is in the direction of arrow D.

It will be appreciated that the dual-hinge system advantageously allows the extension of the scan head for scanning at 2 different selectable locations—the back or the side of the mobile PC lid, depending on available desk space to place the document during scanning. When the cling-on structure is integrated with smaller mobile PCs such as netbooks, the scanner may not have sufficient height to scan a bigger area. Accordingly, the cling-on structure may also comprise a slideable mechanism that allows the lid of the scanner to slide upwards in the direction X in FIG. 16 when the lid is opened. It will also be appreciated that besides scanners, other devices may be affixed to the cling-on structure for integration with a mobile PC.

When scanning uneven or unrolled documents (e.g. certificate/receipts), both hands may be needed to straighten or flatten the document. Accordingly, the cling-on structure allow hands-free scanning as the scanner is able to stand alone with the help of the cling-on structure. The cling-on structure is semi-permanent in that it allows users to attach the scanner to laptop but can be detached if the need arises. The structure is easy to use as a minimum number of steps are required to set it up in order to start scanning. The structure is also relatively mobile as users need not carry a separate device such as a conventional mobile scanner which is relatively bulkier and heavier. The cling-on structure has a non-obtrusive shape which allows the putting in and taking out of the mobile PC from its carrier with ease, without the attached scanner coming off.

It will be appreciated by a person skilled in the art that the various embodiments described above can be used alone or in conjunction with the other embodiments.

The method and system of the example embodiments described above can be implemented on a general microprocessor 1415, 1515, 1615, 1715 located within a scanner.

Figure 18:
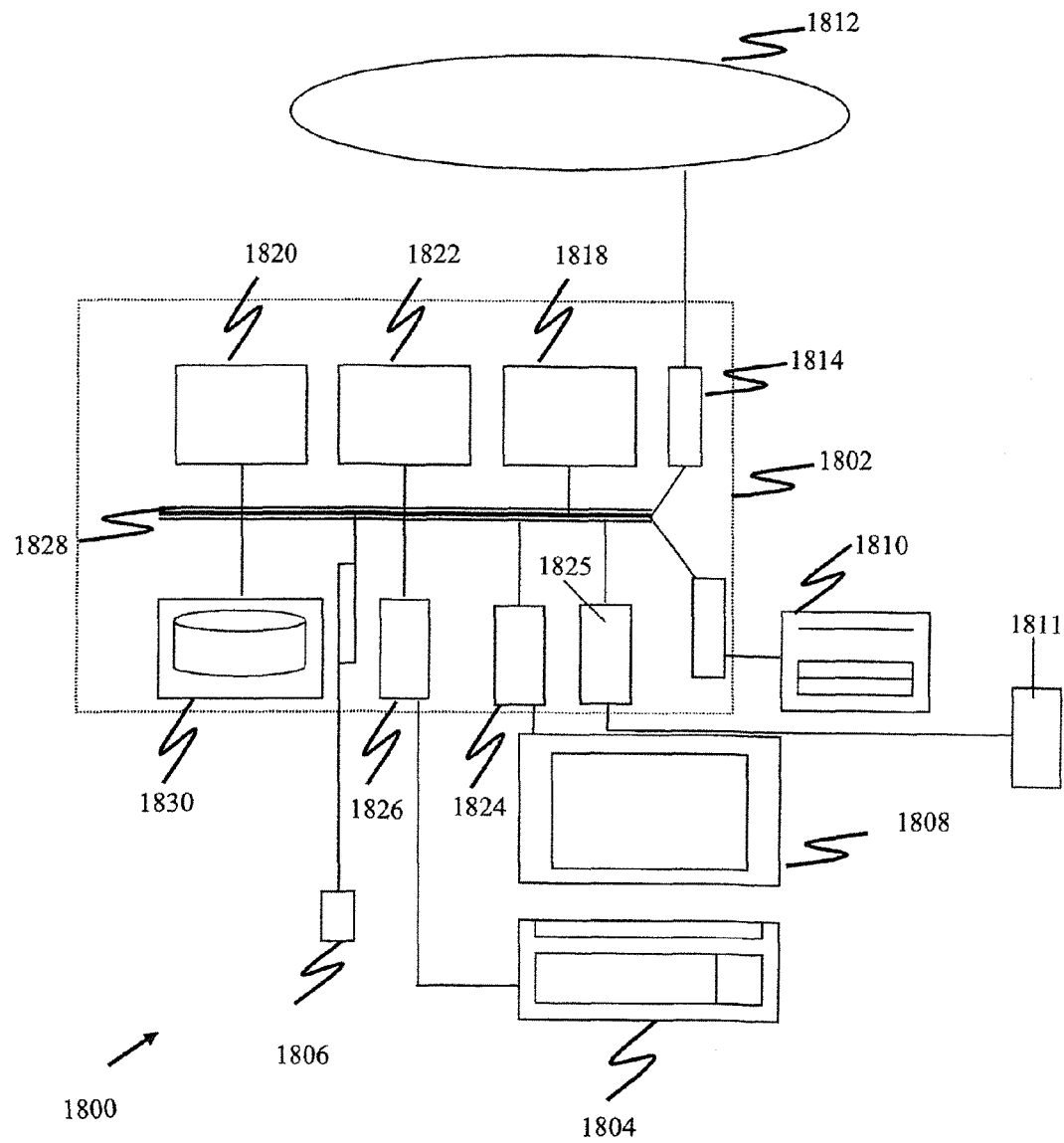
FIG. 18 is a schematic of a computer system for implementing the method and system for scanning.

Alternatively, the scanner can be electronically coupled to a computer system 1800, schematically shown in FIG. 18. Suitable software and/or drivers can be used to facilitate communication between the scanner and the computer system 1800. In addition, a user interface can be provided to facilitate operation and control of the scanner.

The method and system of the example embodiments described above may also be implemented as software, such as a computer program being executed within the computer system 1800, and instructing the computer system 1800 to conduct the method of the example embodiment.

The computer system 1800 comprises a computer module 1802, input modules such as a keyboard 1804 and mouse 806 and a plurality of output devices such as a display 1808, printer 1810 and scanner 1811.

The computer module 1802 is connected to a computer network 1812 via a suitable transceiver device 1814, to enable access to e.g. the Internet or other network systems such as Local Area Network (LAN) or Wide Area Network (WAN).

The computer module 1802 in the example includes a processor 1818, a Random Access Memory (RAM) 1820 and a Read Only Memory (ROM) 1822. The computer module 1802 also includes a number of Input/Output (I/O) interfaces, for example I/O interface 1824 to the display 1808, I/O interface 1826 to the keyboard 1804 and I/O interface 1825 to the scanner 1811.

The components of the computer module 1802 typically communicate via an interconnected bus 1828 and in a manner known to the person skilled in the relevant art.

The application program is typically supplied to the user of the computer system 1800 encoded on a data storage medium such as a CD-ROM or flash memory carrier and read utilising a corresponding data storage medium drive of a data storage device 1830. The application program is read and controlled in its execution by the processor 1818. Intermediate storage of program data maybe accomplished using RAM 1820.

Figure 19:
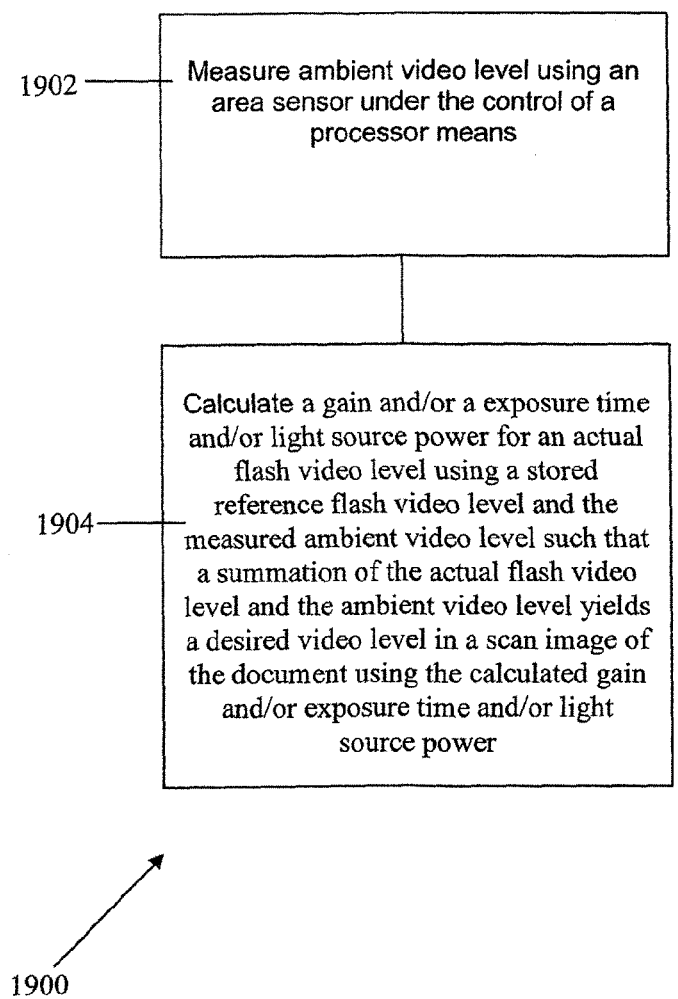
FIG. 19 is a flow chart illustrating a method of scanning, according to an embodiment of the invention.

FIG. 19 is a flow chart; designated generally as reference numeral 1900, illustrating a method of scanning, according to an embodiment of the invention. At step 1902, an ambient video level is measured using an area sensor under the control of a processor means. At step 1904, a gain and/or a exposure time and/or light source power for an actual flash video level is calculated using a stored reference flash video level and the measured ambient video level such that a summation of the actual flash video level and the ambient video level yields a desired video level in a scan image of the document using the calculated gain and/or exposure time and/or light source power.

It will be appreciated by a person skilled in the art that numerous variations and/or modifications may be made to the present invention as shown in the embodiments without departing from a spirit or scope of the invention as broadly described. The embodiments are, therefore, to be considered in all respects to be illustrative and not restrictive.

For example, while the example embodiments have mainly been described in the context of a dedicated scanner device, it will be appreciated that the present invention may alternatively be implemented as an additional feature of mode of other devices such as cameras, mobile phones, laptop or desktop computers etc.

The invention claimed is:

1. A scanner device comprising:
an area sensor;
a light source; and
a processor operatively coupled to the area sensor and the light source;
wherein the scanner device is configured such that the area sensor, under the control of the processor, measures an ambient video level which depends on an exposure time of the area sensor; and
the processor is configured to determine a combination of one or more of a calculated gain, the exposure time and light source power for an actual flash video level using a stored reference flash video level and the measured ambient video level such that a summation of the actual flash video level and the ambient video level yields a desired video level in a scan image of the document using the calculated gain, the exposure time and the light source power.

2. The scanner device of claim 1, wherein the area sensor, under the control of the processor, takes an ambient video level image of the document in a first frame of a scanning mode or a frame obtained from a low resolution video mode during preview, and takes the scan image of the document using the calculated gain and/or exposure time and/or light source power in a second frame, and the image processing comprises subtracting the ambient video level image from the scan image for the ambient light removal.

3. The scanner device of claim 1, wherein the processor applies rotational alignment.

4. The scanner device of claim 1, wherein the processor applies perspective alignment.

5. The scanner device of claim 1, wherein the processor applies automatic cropping.

6. The scanner device of claim 1, wherein the processor applies automatic orientation.

7. The scanner device of claim 3, wherein the scanner further comprises a user interface for providing a blank canvas for positioning different portions of the scan image into a single image file.

8. The scanner device of claim 1, further comprising means for detecting corners of a document by image processing in a live preview mode, and a user interface for displaying the detected corners in a live view image.

9. The scanner device of claim 1, further comprising means for real-time user assignment of scan boundaries, and a user interface for displaying the scan boundaries in a live view image.

10. The scanner device of claim 1, further comprising means for assigning adjustable marquee scan areas for data picking for the scanning.

11. The scanner device of claim 1, further comprising attachment means for attaching the scanner device to an external device.

12. The scanner device of claim 11, wherein the attachment means is configured for releasably attaching the scanner to the external device.

13. The scanner device of claim 11, wherein the attachment means comprises a support member disposed between two or more attachment elements, wherein the support member support a main body of the scanner and the attachment elements are configured to attaching to different portions of the external device.

14. The scanner device of claim 13, wherein one of the attachment elements comprises a hook portion for connecting to an edge of the external device, and the other attachment element comprises a first velcro-based element for cooperating with a second velcro-based element disposed on the external device.

15. The scanner device of claim 1, wherein the area sensor is tilted relative to a scanner body such that a minimum distance between the area sensor and a light source of the scanner for removing a flash spot from the scan image is reduced compared to an un-tilted configuration.

16. The scanner device of claim 1, further comprising a shutter to control the exposure time and facilitate a fast exposure time.

17. The scanner device of claim 16, wherein the shutter is electronic or mechanical.

18. A method of scanning, comprising the steps of:
measuring an ambient video level using an area sensor under the control of a processor, the ambient video level depending on an exposure time of the area sensor; and
calculating a combination of one or more of a calculated gain, the exposure time and light source power for an actual flash video level using a stored reference flash video level and the measured ambient video level such that a summation of the actual flash video level and the ambient video level yields a desired video level in a scan image of the document using the calculated gain, the exposure time and light source power.

19. The method of claim 18, further comprising the steps of:
taking an ambient video level image of the document in a first frame of a scanning mode or a frame obtained from a low resolution video mode during preview;
taking the scan image of the document using the calculated gain and/or exposure time and/or light source power in a second frame; and
subtracting the ambient video level image from the scan image for the ambient light removal.

20. The method of claim 18, further comprising the step of applying rotational alignment.

21. The method of claim 18, further comprising the step of applying perspective alignment.

22. The method of claim 18, further comprising the step of applying automatic cropping.

23. The method of claim 18, further comprising the step of applying automatic orientation.

24. The method of claim 18, further comprising the step of positioning different portions of the scan image into a single image file on a blank canvas.

25. The method of claim 18, further comprising the step of projecting one or more markers indicative of a scan area.

26. The method of claim 18, comprising tilting the area sensor relative to a scanner body such that a minimum distance between the area sensor and a light source of the scanner body for removing a flash spot from the scan image is reduced compared to an un-tilted configuration.

27. The method of claim 18, comprising disposing the area sensor such that it captures the scan image at an off-normal angle with respect to the document such that flash spots are removed from the scan image.

28. The method of claim 27, further comprising applying a perspective correction algorithm to the scan image.

29. The method of claim 27, further comprising automatically detecting a glossy document intended for scanning for changing between a glossy mode and a normal mode of scanning.

* * * * *